United States Patent
Makino et al.

(10) Patent No.: US 8,787,723 B2
(45) Date of Patent: Jul. 22, 2014

(54) RESIN COMPOSITION FOR FORMING OPTICAL WAVEGUIDE, RESIN FILM FOR FORMING OPTICAL WAVEGUIDE, AND OPTICAL WAVEGUIDE

(75) Inventors: Tatsuya Makino, Ibaraki (JP); Toshihiko Takasaki, Ibaraki (JP); Masami Ochiai, Ibaraki (JP); Atsushi Takahashi, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 48 days.

(21) Appl. No.: 13/266,857

(22) PCT Filed: Apr. 28, 2010

(86) PCT No.: PCT/JP2010/057633
§ 371 (c)(1),
(2), (4) Date: Dec. 14, 2011

(87) PCT Pub. No.: WO2010/126116
PCT Pub. Date: Nov. 4, 2010

(65) Prior Publication Data
US 2012/0076468 A1    Mar. 29, 2012

(30) Foreign Application Priority Data
Apr. 30, 2009  (JP) .................................. 2009-111499

(51) Int. Cl.
*G02B 6/10* (2006.01)
*C08F 2/48* (2006.01)

(52) U.S. Cl.
USPC .............................................. 385/143; 522/6

(58) Field of Classification Search
USPC ............................................... 385/143; 522/6
See application file for complete search history.

(56) References Cited

U.S. PATENT DOCUMENTS

| 2008/0260341 A1 | 10/2008 | Shibata et al. |
| 2009/0062421 A1 | 3/2009 | Makino et al. |
| 2010/0040339 A1* | 2/2010 | Makino et al. ................ 385/141 |

FOREIGN PATENT DOCUMENTS

| JP | 6-228274 | 8/1994 |
| JP | 2003-195080 | 7/2003 |
| JP | 2006-146162 | 6/2006 |
| JP | 2008-33239 | 2/2008 |
| WO | WO 2006/038691 A1 | 4/2006 |
| WO | WO 2007/105795 A1 | 9/2007 |
| WO | WO 2008/099787 A1 | 8/2008 |
| WO | WO 2009/041510 A1 | 4/2009 |

OTHER PUBLICATIONS

Machine translation of 2008-033239 to Eriyama et al. (Feb. 14, 2008).*

* cited by examiner

*Primary Examiner* — Vu A Nguyen
(74) *Attorney, Agent, or Firm* — Antonelli, Terry, Stout & Kraus, LLP.

(57) ABSTRACT

A resin composition for forming an optical waveguide, containing (A) a polyhydroxy polyether having an ethylenically unsaturated group on a side chain and an aromatic ring on a main chain, (B) a polymerizable compound having an ethylenically unsaturated group, and (C) a radical polymerization initiator; a resin film for forming an optical waveguide; and an optical waveguide having a core part formed by using the resin film for forming an optical waveguide.

15 Claims, 1 Drawing Sheet

RESIN COMPOSITION FOR FORMING OPTICAL WAVEGUIDE, RESIN FILM FOR FORMING OPTICAL WAVEGUIDE, AND OPTICAL WAVEGUIDE

TECHNICAL FIELD

The present invention relates to a resin composition for forming an optical waveguide, a resin film for forming an optical waveguide, and an optical waveguide.

BACKGROUND ART

In the high-speed and high-density signal transmission among electronic devices and wiring boards, the signal transfer with a conventional electric wiring is now encountering limitation in enhancement of the speed and density due to the barriers including mutual interference and attenuation of the signals. For breaking down the barriers, a technique of connecting electronic devices and wiring boards with light, i.e., the so-called optical interconnection technique, is being developed. A polymer optical waveguide is receiving attention as an optical waveguide owing to the easiness in processing as a transmission path of light, the low cost, the high degree of freedom in wiring, and the capability of high-density wiring.

As the mode of the polymer optical waveguide, a rigid type produced on a rigid support base, such as a glass-epoxy resin, which is assumed to be applied to an optoelectronic board, and a flexible type having no rigid support base, which is assumed to interconnect boards, are considered as preferred examples.

The polymer optical waveguide is demanded to have high transparency (i.e., low optical transmission loss) and high heat resistance from the standpoint of the use environment and the component mounting of the equipment, to which the polymer optical waveguide is applied, and as a material for the optical waveguide, those using an epoxy resin, a (meth) acrylic polymer and the like are proposed (see Patent Documents 1 to 4).

However, there has been no evaluation of environmental reliability, for example; investigation on optical transmission loss and the like after a high temperature and high humidity shelf test and a temperature cycle test, and there has been no product that satisfies the demands.

For example, the epoxy resin disclosed in Patent Document 1 has good transparency at a wavelength of 850 nm and heat resistance around from 200 to 280° C., but there is no description relating to the evaluation of the environmental reliability, which is not investigated.

The (meth)acrylic polymer disclosed in Patent Document 2 is a material for an optical waveguide in a film form and has transparency with an optical transmission loss of 0.3 dB/cm at a wavelength of 850 nm, but there is no description relating to the evaluation of the environmental reliability, for example, specific test results of optical transmission loss and the like after a high temperature and high humidity shelf test and a temperature cycle test, which are not investigated. Similarly, there is no description relating to the evaluation of heat resistance, for example, specific test results of optical transmission loss and the like after a solder reflow test.

The (meth)acrylic polymer disclosed in Patent Documents 3 and 4 is a material for an optical waveguide in a film form and has transparency with an optical transmission loss of 0.5 dB/cm or less at a wavelength of 850 nm and a good optical transmission loss after the high temperature and high humidity shelf test, but there is no description relating to the evaluation of heat resistance, for example, specific test results of optical transmission loss and the like after a solder reflow test, which is not investigated.

The polyhydroxy polyether disclosed in Patent Document 5 has no ethylenically unsaturated group on a side chain, and the material for an optical waveguide in a film form using the polyhydroxy polyether is excellent in transparency and heat resistance, but there is no description relating to the evaluation of low flexibility, for example, a breaking elongation, which is not investigated.

RELATED ART DOCUMENTS

Patent Documents

Patent Document 1: JP-A-6-228274
Patent Document 2: JP-A-2003-195080
Patent Document 3: JP-A-2006-146162
Patent Document 4: JP-A-2008-33239
Patent Document 5: WO 2006/038691

SUMMARY OF THE INVENTION

Problems to be Solved by the Invention

In view of the problems associated with the related art, an object of the present invention is to provide a resin composition for forming an optical waveguide, the resin composition having high productivity and being capable of forming a thick film with high accuracy excellent in transparency, heat resistance and toughness; a resin film for forming an optical waveguide; and an optical waveguide excellent in transparency, environmental reliability and heat resistance.

Means for Solving the Problems

As a result of earnest investigations made by the inventors, it has been found that the problems may be solved by producing an optical waveguide with a resin composition for forming an optical waveguide, the resin composition containing a polyhydroxy polyether having a particular structure, a polymerizable compound and a radical polymerization initiator.

The present invention provides a resin composition for forming an optical waveguide, containing (A) a polyhydroxy polyether having an ethylenically unsaturated group on a side chain and an aromatic ring on a main chain, (B) a polymerizable compound having an ethylenically unsaturated group, and (C) a radical polymerization initiator; a resin film for forming an optical waveguide; and an optical waveguide excellent in transparency, environmental reliability and heat resistance having a core part formed with the resin composition for forming an optical waveguide or the resin film for forming an optical waveguide.

Advantages of the Invention

According to the present invention, a resin composition for forming an optical waveguide may be provided that is useful for a resin film for forming an optical waveguide that is capable of forming a thick film with high accuracy excellent in transparency, heat resistance and toughness, is effective particularly for producing an optical waveguide, and provides considerably high productivity upon producing an optical waveguide. Furthermore, an optical waveguide excellent in transparency, environmental reliability and heat resistance may be provided by forming the optical waveguide with the resin composition for forming an optical waveguide or the resin film for forming an optical waveguide.

MODES FOR CARRYING OUT THE INVENTION

Resin Composition for Forming Optical Waveguide

Figure 1:
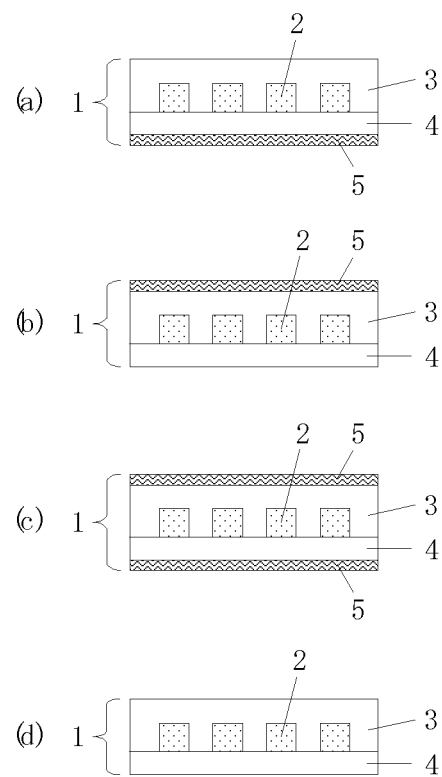
FIG. 1 The figure is a cross sectional view showing a configuration of an optical waveguide according to the present invention.

The resin composition for forming an optical waveguide of the present invention contains (A) a polyhydroxy polyether having an ethylenically unsaturated group on a side chain and an aromatic ring on a main chain, (B) a polymerizable compound having an ethylenically unsaturated group, and (C) a radical polymerization initiator. In the following description, the component (A) may be abbreviated as the polyhydroxy polyether (A) in some cases.

(A) Polyhydroxy Polyether Having Ethylenically Unsaturated Group on Side Chain and Aromatic Ring on Main Chain The polyhydroxy polyether having an ethylenically unsaturated group on a side chain and an aromatic ring on a main chain (A) used in the present invention may be a polymer that is formed in such a manner that a bifunctional phenol and a bifunctional epoxy resin, a bifunctional phenol and epichlorohydrin, or a bifunctional phenol and a bifunctional oxetane compound, as monomers, are polymerized, and then an ethylenically unsaturated group is introduced to a side chain by utilizing the reactivity of the hydroxyl group. A polymer may be also included that is formed in such a manner that the monomers are polymerized to provide a polyhydroxy polyether, the hydroxyl group is then modified with ethylene oxide, propylene oxide, caprolactone or the like, and an ethylenically unsaturated group is introduced to a side chain by utilizing the reactivity of the hydroxyl group at the end of the side chain. A polymer may be also included that is formed in such a manner that a carboxyl group or the like is once introduced by utilizing the reactivity of the hydroxyl group of the polyhydroxy polyether, and an ethylenically unsaturated group is introduced thereto.

The ethylenically unsaturated group introduced to the side chain of the polyhydroxy polyether enables crosslinking with the polymerizable compound having an ethylenically unsaturated group (B) upon curing, thereby enhancing the heat resistance of the resulting cured product without impairing the transparency thereof.

The structural unit derived from the monomer (represented by the following general formula (2)) prevents excessive crosslinking with the polymerizable compound having an ethylenically unsaturated group (B). In view of these factors, a polyhydroxy polyether having structural units represented by the following general formulae (1) and (2) is preferred.

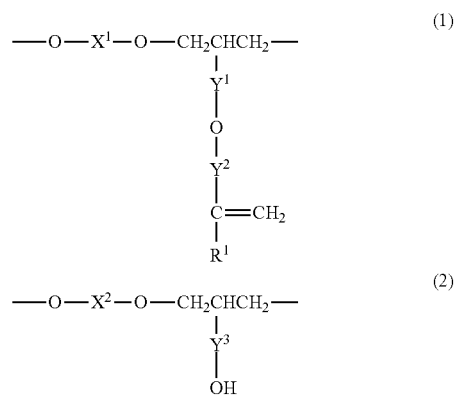

In the formula (1), $R^1$ represents a hydrogen atom or an organic group having from 1 to 20 carbon atoms. Examples of the organic group having from 1 to 20 carbon atoms include a monovalent organic group, such as an alkyl group, a cycloalkyl group, an aryl group, an aralkyl group, a carbonyl group (which means —CO—R, wherein R represents a hydrocarbon group), an ester group (which means —CO—O—R or —O—CO—R, wherein R represents a hydrocarbon group) and a carbamoyl group, which may be further substituted with a hydroxyl group, a halogen atom, an alkyl group, a cycloalkyl group, an aryl group, an aralkyl group, a carbonyl group, a formyl group, an ester group, an amide group, an alkoxy group, an aryloxy group, an alkylthio group, an arylthio group, an amino group, a silyl group, a silyloxy group or the like. Among these, an alkyl group, a cycloalkyl group, an aryl group and an aralkyl group are preferred from the standpoint of transparency and heat resistance.

$X^1$ is not particularly limited as far as it is a divalent group, and examples thereof include a divalent group containing an aromatic ring, such as groups derived from a mononuclear bifunctional phenol, such as hydroquinone, resorcinol, catechol, 1,4-naphthalenediol, 1,5-naphthalenediol, 1,6-naphthalenediol and 1,7-naphthalenediol, and organic group-substituted compounds and fluorine-containing organic group-substituted compounds thereof; and groups derived from a polynuclear bifunctional phenol, such as 2,2'-biphenol, 4,4'-biphenol, bisphenol A, tetrabromobisphenol A, bisphenol F, bisphenol AD, bisphenol S, bisphenol Z and fluorenone type bisphenol, and organic group-substituted compounds and fluorine-containing organic group-substituted compound thereof, such as bisphenol AF, which are represented by the following general formulae. Among these, groups derived from the polynuclear bifunctional phenol, and the organic group-substituted compounds and the fluorine-containing organic group-substituted compounds thereof, such as bisphenol AF, are preferred from the standpoint of transparency and heat resistance. These groups may be used solely or as a combination of two or more kinds thereof, and may be used in combination with a divalent group having no aromatic ring, such as an alkylene group, a cycloalkylene group, a polyether group, a polysiloxane group, a carbonyl group, an ester group, an amide group and a urethane group, in such an extent that the heat resistance is not impaired.

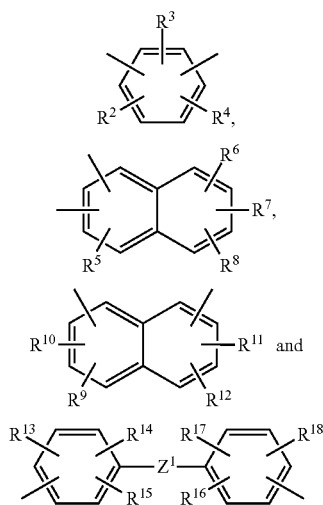

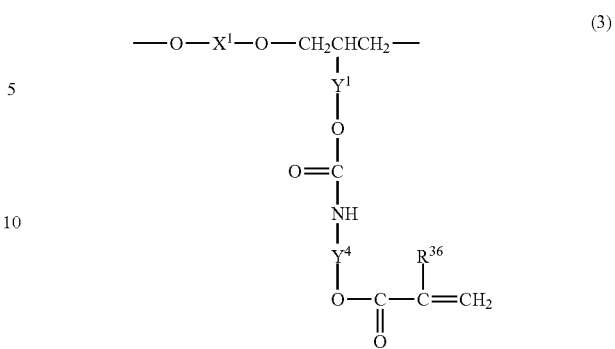

In the formulae, $R^2$ to $R^{18}$ each independently represent a hydrogen atom, a fluorine atom or an organic group having from 1 to 20 carbon atoms. Preferred examples of the organic group having from 1 to 20 carbon atoms include those described as the examples for $R^1$.

$Z^1$ represents a single bond, an oxygen atom, a sulfur atom, or a divalent group selected from —CH$_2$—, —C(CH$_3$)$_2$—, —CF$_2$—, —C(CF$_3$)$_2$—, —SO$_2$—,

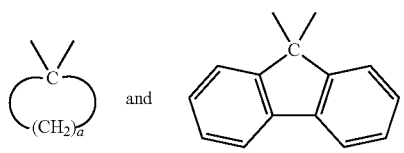

wherein a represents an integer of from 2 to 10.

In the formula (1), $Y^1$ represents a single bond or a divalent organic group having from 1 to 20 carbon atoms, and $Y^2$ represents a divalent organic group having from 1 to 20 carbon atoms.

Examples of the divalent organic group having from 1 to 20 carbon atoms include a divalent organic group containing an alkylene group, a cycloalkylene group, a phenylene group, a polyether group, a polysiloxane group, a carbonyl group, an ester group, an amide group, a urethane group or the like, which may be further substituted with a halogen atom, an alkyl group, a cycloalkyl group, an aryl group, an aralkyl group, a carbonyl group, a formyl group, an ester group, an amide group, an alkoxy group, an aryloxy group, an alkylthio group, an arylthio group, a silyl group, a silyloxy group or the like.

The structural unit represented by the general formula (1) is preferably represented by the following general formula (3) having a urethane group and a (meth)acryloyl group from the standpoint of exhibiting transparency and heat resistance and furthermore imparting toughness for enhancing the elongation. The term "(meth)acryloyl group" means a methacryloyl group and/or an acryloyl group.

In the formula, $R^{36}$ represents a hydrogen atom or a methyl group. $Y^4$ is not particularly limited as far as it is a divalent organic group having from 1 to 18 carbon atoms, and examples thereof include a divalent organic group containing an alkylene group, a cycloalkylene group, a phenylene group, a polyether group, a polysiloxane group, a carbonyl group, an ester group, an amide group or the like, which may be further substituted with a halogen atom, an alkyl group, a cycloalkyl group, an aryl group, an aralkyl group, a carbonyl group, a formyl group, an ester group, an amide group, an alkoxy group, an aryloxy group, an alkylthio group, an arylthio group, a silyl group, a silyloxy group or the like.

In the formula (2), $X^2$ is not particularly limited as far as it is a divalent group, as similar to $X^1$, and examples thereof include a divalent group containing an aromatic ring, such as groups derived from a mononuclear bifunctional phenol, such as hydroquinone, resorcinol, catechol, 1,4-naphthalenediol, 1,5-naphthalenediol, 1,6-naphthalenediol and 1,7-naphthalenediol, and organic group-substituted compounds and fluorine-containing organic group-substituted compounds thereof; and groups derived from a polynuclear bifunctional phenol, such as 2,2'-biphenol, 4,4'-biphenol, bisphenol A, tetrabromobisphenol A, bisphenol F, bisphenol AD, bisphenol S, bisphenol Z and fluorenone type bisphenol, and organic group-substituted compounds and fluorine-containing organic group-substituted compound thereof, such as bisphenol AF, which are represented by the following general formulae. Among these, groups derived from the polynuclear bifunctional phenol, and the organic group-substituted compounds and the fluorine-containing organic group-substituted compounds thereof, such as bisphenol AF, are preferred from the standpoint of transparency and heat resistance. These groups may be used solely or as a combination of two or more kinds thereof, and may be used in combination with a divalent group having no aromatic ring, such as an alkylene group, a cycloalkylene group, a polyether group, a polysiloxane group, a carbonyl group, an ester group, an amide group and a urethane group, in such an extent that the heat resistance is not impaired.

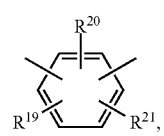

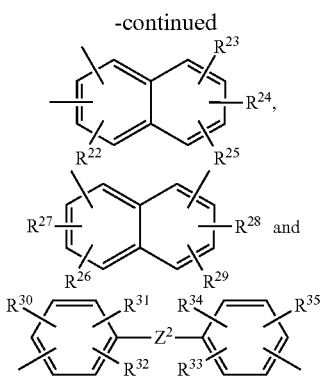

In the formulae, $R^{19}$ to $R^{35}$ each independently represent a hydrogen atom, a fluorine atom or an organic group having from 1 to 20 carbon atoms. Preferred examples of the organic group having from 1 to 20 carbon atoms include those described as the examples for $R^1$.

$Z^2$ represents a single bond, an oxygen atom, a sulfur atom or a divalent group selected from —$CH_2$—, —$C(CH_3)_2$—, —$CF_2$—, —$C(CF_3)_2$—, —$SO_2$—,

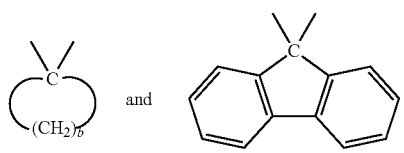

wherein b represents an integer of from 2 to 10.

In the formula (2), $Y^3$ represents a single bond or a divalent organic group having from 1 to 20 carbon atoms. Examples of the divalent organic group having from 1 to 20 carbon atoms include those described as the examples for $Y^1$ and $Y^2$.

In the case where the polyhydroxy polyether (A) of the present invention has the structural units represented by the general formula (1) and the general formula (2), the content of the structural unit represented by the general formula (1) is preferably from 3 to 70% by mol. When the content is 3% by mol or more, the structural unit may be sufficiently crosslinked with the polymerizable compound having an ethylenically unsaturated group as the component (B) upon curing, thereby providing a cured product having good heat resistance, and when the content is 70% or less, the crosslinking density may not be increased too much, thereby preventing the resulting cured product from being brittle. In these points of view, the content is more preferably from 5 to 60% by mol, and particularly preferably from 10 to 50% by mol.

The content of the structural unit represented by the general formula (2) is preferably from 30 to 97% by mol. When the content is 30% by mol or more, the structural unit may be prevented from being crosslinked excessively with the polymerizable compound having an ethylenically unsaturated group as the component (B) upon curing, thereby preventing the resulting cured product from being brittle, and when the content is 97% by mol or less, the structural unit may be sufficiently crosslinked, thereby providing a cured product having good heat resistance. In these points of view, the content is more preferably from 40 to 95% by mol, and particularly preferably from 50 to 90% by mol.

The component (A) is particularly preferably a polyhydroxy polyether having a skeleton derived from bisphenol A and bisphenol F as a main chain, and an ethylenically unsaturated group introduced to a side chain thereof. The polyhydroxy polyether having a skeleton derived from bisphenol A and bisphenol F as a main chain is commercially available, for example, as a phenoxy resin, "Phenotohto YP-70", a trade name, from Tohto Kasei Co., Ltd.

The synthesis method of the polyhydroxy polyether having an ethylenically unsaturated group on a side chain and an aromatic ring on a main chain (A) is not particularly limited, and it may be obtained, for example, in such a manner that a polyhydroxy polyether having an aromatic ring on a main chain is dissolved in a solvent, and an ethylenically unsaturated isocyanate is added to the hydroxyl group of the polyhydroxy polyether. It may also be obtained in such a manner that a polybasic acid anhydride is addition-reacted with the hydroxyl group of the polyhydroxy polyether to provide a carboxylic acid-modified polyhydroxy polyether, and then an ethylenically unsaturated group-containing epoxide, an ethylenically unsaturated group-containing oxetane, an ethylenically unsaturated isocyanate or an ethylenically unsaturated group-containing alcohol is added to the carboxyl group. The amounts of the compounds used may be controlled in such a manner that the contents of the structural units represented by the general formulae (1) and (2) are in the aforementioned ranges.

The ethylenically unsaturated isocyanate used in the synthesis is not particularly limited, and examples thereof include (meth)acryloyloxymethylisocyanate, 2-(meth)acryloyloxyethylisocyanate, 2-(meth)acryloyloxyethoxyethylisocyanate and 1,1-bis((meth)acryloyloxymethyl)ethylisocyanate.

Among these, (meth)acryloyloxymethylisocyanate, 2-(meth)acryloyloxyethylisocyanate and 2-(meth)acryloyloxyethoxyethylisocyanate are preferred from the standpoint of transparency and heat resistance.

These compounds may be used solely or as a combination of two or more kinds thereof.

The polybasic acid anhydride is not particularly limited, and examples thereof include succinic anhydride, glutaric anhydride, itaconic anhydride, maleic anhydride, citraconic anhydride, phthalic anhydride, tetrahydrophthalic anhydride, hexahydrophthalic anhydride, trimellitic anhydride and hexahydrotrimellitic anhydride.

Among these, succinic anhydride, glutaric anhydride, tetrahydrophthalic anhydride, hexahydrophthalic anhydride and hexahydrotrimellitic anhydride are preferred from the standpoint of transparency and heat resistance.

These compounds may be used solely or as a combination of two or more kinds thereof.

The ethylenically unsaturated group-containing epoxide is not particularly limited, and examples thereof include glycidyl(meth)acrylate, α-ethylglycidyl(meth)acrylate, α-n-propylglycidyl(meth)acrylate, α-n-butylglycidyl(meth)acrylate, 2-methylglycidyl(meth)acrylate, 2-ethylglycidyl(meth)acrylate, 2-propylglycidyl(meth)acrylate, 3,4-epoxybutyl(meth)acrylate, 6,7-epoxyheptyl(meth)acrylate, α-ethyl-6,7-epoxyheptyl(meth)acrylate, 3,4-epoxycyclohexylmethyl(meth)acrylate, o-vinylbenzyl glycidyl ether, m-vinylbenzyl glycidyl ether and p-vinylbenzyl glycidyl ether.

Among these, glycidyl(meth)acrylate, 3,4-epoxybutyl(meth)acrylate, 3,4-epoxyheptyl(meth)acrylate and 6,7-epoxycyclohexylmethyl(meth)acrylate are preferred from the standpoint of transparency and heat resistance.

These compounds may be used solely or as a combination of two or more kinds thereof.

The ethylenically unsaturated group-containing oxetane is not particularly limited, and examples thereof include (2-ethyl-2-oxetanyl)methyl(meth)acrylate, (2-methyl-2-oxetanyl)methyl(meth)acrylate, 2-(2-ethyl-2-oxetanyl)ethyl (meth)acrylate, 2-(2-methyl-2-oxetanyl)ethyl(meth)acrylate, 3-(2-ethyl-2-oxetanyl)propyl(meth)acrylate and 3-(2-methyl-2-oxetanyl)propyl(meth)acrylate.

Among these, (2-ethyl-2-oxetanyl)methyl(meth)acrylate, (2-methyl-2-oxetanyl)methyl(meth)acrylate, 2-(2-ethyl-2-oxetanyl)ethyl(meth)acrylate and 2-(2-methyl-2-oxetanyl)ethyl(meth)acrylate are preferred from the standpoint of transparency and heat resistance.

These compounds may be used solely or as a combination of two or more kinds thereof.

The ethylenically unsaturated group-containing alcohol is not particularly limited, and examples thereof include 2-hydroxyethyl(meth)acrylate, 2-hydroxypropyl(meth)acrylate, 2-hydoxypropyl-3-phenoxy(meth)acrylate, 3-chloro-2-hydroxypropyl(meth)acrylate and 2-hydroxybutyl(meth)acrylate.

Among these, 2-hydroxyethyl(meth)acrylate, 2-hydroxypropyl(meth)acrylate, 2-hydoxypropyl-3-phenoxy(meth)acrylate and 2-hydroxybutyl(meth)acrylate are preferred from the standpoint of transparency and heat resistance.

These compounds may be used solely or as a combination of two or more kinds thereof.

The organic solvent used as the reaction solvent is not particularly limited as far as it is an aprotic solvent capable of dissolving the polyhydroxy polyether having an aromatic ring on a main chain, and examples thereof include an aromatic hydrocarbon, such as toluene, xylene, mesitylene, cumene and p-cymene; a linear ether, such as diethyl ether, tert-butyl methyl ether, cyclopentyl methyl ether and dibutyl ether; a cyclic ether, such as tetrahydrofuran and 1,4-dioxane; a ketone, such as acetone, methyl ethyl ketone, methyl isobutyl ketone and cyclohexanone; an ester, such as methyl acetate, ethyl acetate, butyl acetate and γ-butyrolactone; a carbonate ester, such as ethylene carbonate and propylene carbonate; a polyhydric alcohol alkyl ether, such as ethylene glycol dimethyl ether, ethylene glycol diethyl ether, propylene glycol dimethyl ether, propylene glycol diethyl ether, diethylene glycol dimethyl ether and diethylene glycol diethyl ether; a polyhydric alcohol alkyl ether acetate, such as ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monomethyl ether acetate and diethylene glycol monoethyl ether acetate; and an amide, such as N,N-dimethylformamide, N,N-dimethylacetamide and N-methylpyrrolidone.

These organic solvents may be used solely or as a combination of two or more kinds thereof.

The weight average molecular weight of the polyhydroxy polyether having an ethylenically unsaturated group on a side chain and an aromatic ring on a main chain (A) is preferably from $1.0 \times 10^3$ to $1.0 \times 10^6$. When the weight average molecular weight is $1.0 \times 10^3$ or more, the resin composition may provide sufficient strength owing to the large molecular weight, and when the weight average molecular weight is $1.0 \times 10^6$ or less, the resin composition may enable development with various kinds of known developer solutions in the developing step of forming a pattern by removing selectively a layer of a photosensitive resin composition described later, and good compatibility may be obtained with the polymerizable compound having an ethylenically unsaturated group as the component (B). The weight average molecular weight is more preferably from $3.0 \times 10^3$ to $5.0 \times 10^5$, and particularly preferably from $5.0 \times 10^3$ to $3.0 \times 10^5$, from these view points.

The weight average molecular weight referred in the present invention is a value obtained by measuring with gel permeation chromatography (GPC, carrier solvent: tetrahydrofuran) and converted based on the standard polystyrene.

The amount of the polyhydroxy polyether having an ethylenically unsaturated group on a side chain and an aromatic ring on a main chain (A) mixed is preferably from 10 to 90% by mass based on the total amount of the component (A) and the polymerizable compound having an ethylenically unsaturated group as the component (B). When the amount is 10% by mass or more, the resin composition for forming an optical waveguide containing the polymerizable compound having an ethylenically unsaturated group as the component (B) and the radical polymerization initiator as the component (C) may be easily formed into a film, and when the amount is 90% by mass or less, it may be sufficiently crosslinked with the polymerizable compound having an ethylenically unsaturated group as the component (B) upon curing, thereby preventing the developer solution resistance from being short. The amount of the component (A) mixed is more preferably from 15 to 80% by mass, and particularly preferably from 20 to 70% by mass, from these view points.

(B) Polymerizable Compound Having Ethylenically Unsaturated Group

In the present invention, the use of the polymerizable compound having an ethylenically unsaturated group as the component (B) enables crosslinking with the polyhydroxy polyether having an ethylenically unsaturated group on a side chain and an aromatic ring on a main chain (A) upon curing, and thereby the heat resistance of the resulting cured product can be enhanced without impairing the transparency thereof.

The polymerizable compound having an ethylenically unsaturated group as the component (B) is not particularly limited, as far as it is selected from the other compounds than the component (A), and examples thereof include a (meth)acrylate, a vinyl ether, a vinyl ester, a vinylamide, an arylated vinyl compound, vinylpyridine, a halogenated vinyl compound and a halogenated vinylidene compound.

Among these, a (meth)acrylate and an arylated vinyl compound are preferred from the standpoint of transparency and heat resistance. Examples of the (meth)acrylate include a monofunctional compound, a bifunctional compound and a trifunctional or higher functional compound.

Examples of the monofunctional (meth)acrylate include an aliphatic (meth)acrylate, an ethoxylated compound thereof, a propoxylated compound thereof, an ethoxylated propoxylated compound thereof and a caprolactone-modified compound thereof, such as methyl(meth)acrylate, ethyl(meth)acrylate, propyl(meth)acrylate, isopropyl(meth)acrylate, butyl(meth)acrylate, isobutyl(meth)acrylate, sec-butyl(meth)acrylate, tert-butyl(meth)acrylate, butoxyethyl(meth)acrylate, pentyl(meth)acrylate, hexyl(meth)acrylate, 2-ethylhexyl(meth)acrylate, heptyl(meth)acrylate, octylheptyl(meth)acrylate, nonyl(meth)acrylate, decyl(meth)acrylate, undecyl(meth)acrylate, dodecyl(meth)acrylate, tridecyl(meth)acrylate, tetradecyl(meth)acrylate, pentadecyl(meth)acrylate, hexadecyl(meth)acrylate, octadecyl(meth)acrylate, behenyl(meth)acrylate, 2-hydroxyethyl(meth)acrylate, 2-hydroxypropyl(meth)acrylate, 3-chloro-2-hydroxypropyl(meth)acrylate, 2-hydroxybutyl(meth)acrylate, methoxypolyethylene glycol(meth)acrylate, ethoxypolyethylene glycol(meth)acrylate, methoxypolypropylene glycol(meth)acrylate, ethoxypolypropylene glycol(meth)acrylate and mono(2-(meth)acryloyloxyethyl)succinate; an alicyclic (meth)acrylate, an ethoxylated compound thereof, a propoxylated compound thereof, an ethoxylated propoxylated compound thereof and a caprolactone-modified compound thereof, such ascyclopentyl(meth)acrylate, cyclohexyl(meth)acrylate, dicyclopentanyl(meth)acrylate, dicyclopentenyl (meth)acrylate, isobornyl(meth)acrylate, mono(2-(meth) acryloyloxyethyl)tetrahydrophthalate and mono(2-(meth) acryloyloxyethyl)hexahydrophthalate; an aromatic(meth) acrylate, an ethoxylated compound thereof, a propoxylated compound thereof, an ethoxylated propoxylated compound thereof and a caprolactone-modified compound thereof, such as phenyl(meth)acrylate, benzyl(meth)acrylate, o-biphenyl (meth)acrylate, 1-naphtyl(meth)acrylate, 2-naphthyl(meth) acrylate, phenoxyethyl(meth)acrylate, p-cumylphenoxyethyl(meth)acrylate, o-phenylphenoxyethyl(meth)acrylate, 1-naphthoxyethyl(meth)acrylate, 2-naphthoxyethyl(meth) acrylate, phenoxypolyethylene glycol(meth)acrylate, nonylphenoxypolyethylene glycol(meth)acrylate, phenoxypolypropylene glycol(meth)acrylate, 2-hydroxy-3-phenoxypropyl(meth)acrylate, 2-hydroxy-3-(o-phenylphenoxy)propyl(meth)acrylate, 2-hydroxy-3-(1-naphthoxy)propyl(meth)acrylate and 2-hydroxy-3-(2-naphthoxy)propyl(meth)acrylate; and a heterocyclic(meth) acrylate, an ethoxylated compound thereof, a propoxylated compound thereof, an ethoxylated propoxylated compound thereof and a caprolactone-modified compound thereof, such as 2-tetrahydrofurfuryl(meth)acrylate, N-(meth)acryloyloxyethyltetrahydrophthalimide, N-(meth)acryloyloxyethylhexahydrophthalimide, isocyanuric acid mono(meth)acrylate and 2-(meth)acryloyloxyethyl-N-carbazole.

Among these, an alicyclic(meth)acrylate, an ethoxylated compound thereof, a propoxylated compound thereof, an ethoxylated propoxylated compound thereof and a caprolactone-modified compound thereof, such as cyclohexyl(meth) acrylate, dicyclopentanyl(meth)acrylate, dicyclopentenyl (meth)acrylate and isobornyl(meth)acrylate; an aromatic (meth)acrylate, an ethoxylated compound thereof, a propoxylated compound thereof, an ethoxylated propoxylated compound thereof and a caprolactone-modified compound thereof, such as benzyl(meth)acrylate, phenoxyethyl (meth)acrylate, p-cumylphenoxyethyl(meth)acrylate, o-phenylphenoxyethyl(meth)acrylate, phenoxypolyethylene glycol(meth)acrylate, phenoxypolypropylene glycol(meth) acrylate, 2-hydroxy-3-phenoxypropyl(meth)acrylate and 2-hydroxy-3-(o-phenylphenoxy)propyl(meth)acrylate; and a heterocyclic(meth)acrylate, an ethoxylated compound thereof, a propoxylated compound thereof, an ethoxylated propoxylated compound thereof and a caprolactone-modified compound thereof, such as N-(meth)acryloyloxyethyltetrahydrophthalimide, N-(meth)acryloyloxyethylhexahydrophthalimide, isocyanuric acid mono(meth)acrylate and 2-(meth)acryloyloxyethyl-N-carbazole are preferred, and an aromatic mono(meth)acrylate represented by the following general formula (4) is more preferred, from the standpoint of transparency and heat resistance.

The ethoxylated compound, the propoxylated compound and the ethoxylated propoxylated compound of the (meth) acrylate referred herein are (meth)acrylates that are obtained by replacing the original alcohol or phenol compound (for example, a compound represented by HO—$R^2$ in the case of a mono(meth)acrylate, $CH_2$=$CH(R^1)$—COO—$R^2$ (wherein $R^1$ represents a hydrogen atom or a methyl group, and $R^2$ represents a monovalent organic group)) by an alcohol having a structure obtained by adding one or more ethylene oxide to the alcohol or phenol compound, an alcohol having a structure obtained by adding one or more propylene oxide thereto, and an alcohol having a structure obtained by adding one or more ethylene oxide and propylene oxide thereto, respectively (for example, the ethoxylated compound is represented by $CH_2$=$CH(R^1)$—COO—$(CH_2CH_2O)_n$—$R^2$ (wherein n represents an integer of 1 or more). For example, an ethoxylated compound of phenoxyethyl(meth)acrylate means a (meth)acrylate obtained by reacting alcohol prepared by adding ethylene oxide to phenoxyethyl alcohol with acrylic acid or methacrylic acid. The caprolactone-modified compound is a (meth)acrylate that is obtained by replacing the original alcohol as a raw material of the (meth)acrylate by a modified alcohol obtained by modifying with caprolactone (for example, an ε-caprolactone-modified compound of a mono (meth)acrylate is represented by $CH_2$=$CH(R^1)$—COO—$((CH_2)_5COO)_n$—$R^2$ (wherein n, $R^1$ and $R^2$ have the same meanings as above)).

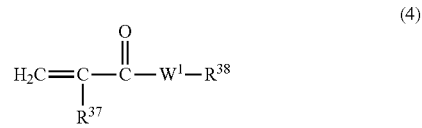

(4)

In the formula, $R^{37}$ represents a hydrogen atom or a methyl group, and $R^{38}$ represents any one selected from monovalent groups represented by the following formulae.

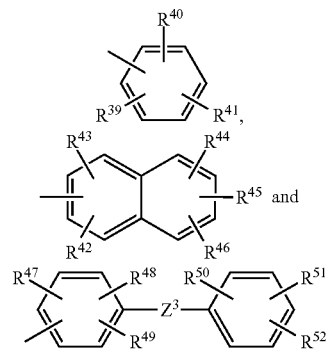

In the formulae, $R^{39}$ to $R^{52}$ each independently represent any one selected from a hydrogen atom, a fluorine atom and an organic group having from 1 to 20 carbon atoms. Preferred examples of the organic group having from 1 to 20 carbon atoms include those described as the examples for $R^1$.

$Z^3$ represents a single bond, an oxygen atom, a sulfur atom or a divalent group selected from —$CH_2$—, —$C(CH_3)_2$—, —$CF_2$—, —$C(CF_3)_2$—, —$SO_2$—,

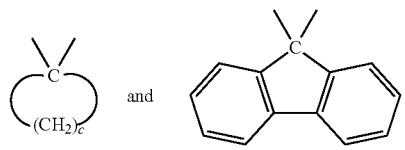

wherein c represents an integer of from 2 to 10.

In the formula (4), $W^1$ contains an oxygen atom, a sulfur atom or a divalent group selected from —$OCH_2$—, —$SCH_2$—, —$O(CH_2CH_2O)_d$—, —$O[CH_2CH(CH_3)O]_e$—, —$O[(CH_2)_5CO_2]_f$— and —$OCH_2CH(OH)CH_2O$—, wherein d to f represent an integer of from 1 to 10.

Examples of the bifunctional (meth)acrylate include an aliphatic (meth)acrylate, an ethoxylated compound thereof, a propoxylated compound thereof, an ethoxylated propoxylated compound thereof and a caprolactone-modified compound thereof, such as ethylene glycol di(meth)acrylate, diethylene glycol di(meth)acrylate, polyethylene glycol di(meth)acrylate, propylene glycol di(meth)acrylate, dipropylene glycol di(meth)acrylate, polypropylene glycol di(meth)acrylate, 1,3-propanediol di(meth)acrylate, 2-methyl-1,3-propanediol di(meth)acrylate, 2-butyl-2-ethyl-1,3-propanediol di(meth)acrylate, 1,4-butanediol di(meth)acrylate, neopentyl glycol di(meth)acrylate, 3-methyl-1,5-pentanediol di(meth)acrylate, 1,6-hexanediol di(meth)acrylate, 1,9-nonanediol di(meth)acrylate, 1,10-decanediol di(meth)acrylate and glycerin di(meth)acrylate; an aliphatic epoxy(meth)acrylate, such as ethylene glycol type epoxy di(meth)acrylate, diethylene glycol type epoxy di(meth)acrylate, polyethylene glycol type epoxy di(meth)acrylate, propylene glycol type epoxy di(meth)acrylate, dipropylene glycol type epoxy di(meth)acrylate, polypropylene glycol type epoxy di(meth)acrylate, 1,3-propanediol type epoxy di(meth)acrylate, 2-methyl-1,3-propanediol type epoxy di(meth)acrylate, 2-butyl-2-ethyl-1,3-propanediol type epoxy di(meth)acrylate, 1,4-butanediol type epoxy di(meth)acrylate, neopentyl glycol type epoxy di(meth)acrylate, 3-methyl-1,5-pentanediol type epoxy di(meth)acrylate, 1,6-hexanediol type epoxy di(meth)acrylate, 1,9-nonanediol type epoxy di(meth)acrylate and 1,10-decanediol type epoxy di(meth)acrylate; an alicyclic(meth)acrylate, an ethoxylated compound thereof, a propoxylated compound thereof, an ethoxylated propoxylated compound thereof and a caprolactone-modified compound thereof, such as cyclohexanedimethanol di(meth)acrylate, tricyclodecanedimethanol di(meth)acrylate, hydrogenated bisphenol A di(meth)acrylate and hydrogenated bisphenol F di(meth)acrylate; an alicyclic epoxy(meth)acrylate, such as cyclohexanedimethanol type epoxy di(meth)acrylate, tricyclodecanedimethanol type epoxy di(meth)acrylate, hydrogenated bisphenol A type epoxy di(meth)acrylate and hydrogenated bisphenol F type epoxy di(meth)acrylate; an aromatic(meth)acrylate, an ethoxylated compound thereof, a propoxylated compound thereof, an ethoxylated propoxylated compound thereof and a caprolactone-modified compound thereof, such as hydroquinone di(meth)acrylate, resorcinol di(meth)acrylate, catechol di(meth)acrylate, bisphenol A di(meth)acrylate, bisphenol F di(meth)acrylate, bisphenol AF di(meth)acrylate, biphenol di(meth)acrylate and fluorene type di(meth)acrylate; an aromatic epoxy(meth)acrylate, such as hydroquinone type epoxy di(meth)acrylate, resorcinol type epoxy di(meth)acrylate, catechol type epoxy di(meth)acrylate, bisphenol A type epoxy di(meth)acrylate, bisphenol F type epoxy di(meth)acrylate, bisphenol AF type epoxy di(meth)acrylate, biphenol type epoxy di(meth)acrylate and fluorene type epoxy di(meth)acrylate; a heterocyclic(meth)acrylate, an ethoxylated compound thereof, a propoxylated compound thereof, an ethoxylated propoxylated compound thereof and a caprolactone-modified compound thereof, such as isocyanuric acid di(meth)acrylate; and a heterocyclic(meth)acrylate, such as monoallyl isocyanurate type epoxy di(meth)acrylate.

Among these, the aforementioned alicyclic(meth)acrylate, an ethoxylated compound thereof, a propoxylated compound thereof, an ethoxylated propoxylated compound thereof and a caprolactone-modified compound thereof; the aforementioned alicyclic epoxy(meth)acrylate; an aromatic(meth)acrylate, an ethoxylated compound thereof, a propoxylated compound thereof, an ethoxylated propoxylated compound thereof and a caprolactone-modified compound thereof, such as bisphenol A di(meth)acrylate, bisphenol F di(meth)acrylate, bisphenol AF di(meth)acrylate, biphenol di(meth)acrylate and fluorene type di(meth)acrylate; an aromatic epoxy (meth)acrylate, such as bisphenol A type epoxy di(meth)acrylate, bisphenol F type epoxy di(meth)acrylate, bisphenol AF type epoxy di(meth)acrylate, biphenol type epoxy di(meth)acrylate and fluorene type epoxy di(meth)acrylate; the aforementioned heterocyclic(meth)acrylate, an ethoxylated compound thereof, a propoxylated compound thereof, an ethoxylated propoxylated compound thereof and a caprolactone-modified compound thereof; and the aforementioned heterocyclic(meth)acrylate are preferred, and an aromatic (meth)acrylate represented by the following general formula (5) and an aromatic epoxy(meth)acrylate represented by the following general formula (6) are more preferred, from the standpoint of transparency and heat resistance.

It is particularly preferred to use an aromatic(meth)acrylate represented by the general formula (5) and an aromatic epoxy (meth)acrylate represented by the general formula (6) in combination.

Preferred examples of the aromatic(meth)acrylate represented by the general formula (5) include compounds with $Z^4$ being —$C(CH_3)_2$— and a fluorene skeleton, which are commercially available, for example, as "NK Ester A-BPEF", a trade name, from Shin-Nakamura Chemical Co., Ltd., and "Fancryl FA-321A", a trade name, from Hitachi Chemical Co., Ltd.

It is considerably preferred to use two or more kinds of the aromatic epoxy(meth)acrylate represented by the general formula (6) in combination.

Preferred examples of the aromatic epoxy(meth)acrylate represented by the general formula (6) include compounds with $Z^5$ being —$C(CH_3)_2$—, which are commercially available, for example, as "NK Oligo EA-5222" and "NK Oligo EA-1020", trade names, from Shin-Nakamura Chemical Co., Ltd.

The ethoxylated compound, the propoxylated compound, the ethoxylated propoxylated compound and the caprolactone-modified compound have the same meanings as above.

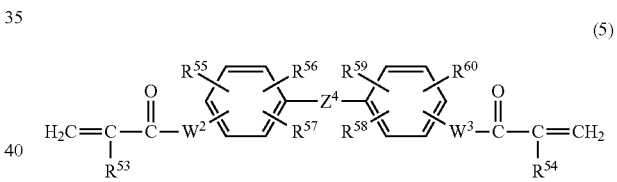

(5)

In the formula, $R^{53}$ and $R^{54}$ each independently represent a hydrogen atom or a methyl group, and $R^{55}$ to $R^{60}$ each independently represent any one selected from a hydrogen atom, a fluorine atom and an organic group having from 1 to 20 carbon atoms. Preferred examples of the organic group having from 1 to 20 carbon atoms include those described as the examples for $R^1$.

$Z^4$ represents a single bond, an oxygen atom, a sulfur atom or a divalent group selected from —$CH_2$—, —$C(CH_3)_2$—, —$CF_2$—, —$C(CF_3)_2$—, —$SO_2$—,

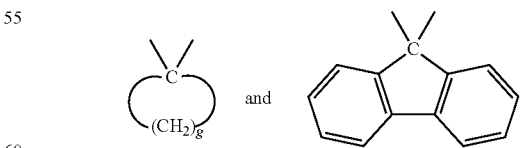

wherein g represents an integer of from 2 to 10.

In the formula (5), $W^2$ and $W^3$ each independently contain an oxygen atom, a sulfur atom or a divalent group selected from —$OCH_2$—, —$SCH_2$—, —$O(CH_2CH_2O)_h$—, and —$O[CH_2CH(CH_3)O]_i$— and —$O[(CH_2)_5CO_2]_j$—, wherein h to j each independently represent an integer of from 1 to 10.

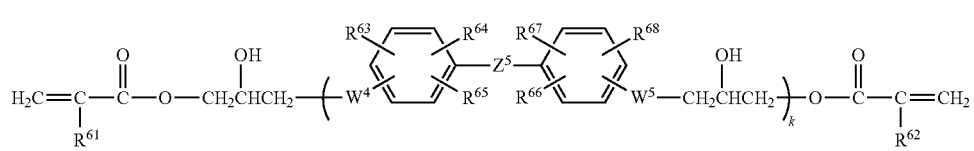

(6)

In the formula, k represents an integer of from 1 to 10, $R^{61}$ and $R^{62}$ each independently represent a hydrogen atom or a methyl group, and $R^{63}$ to $R^{68}$ each independently represent any one selected from a hydrogen atom, a fluorine atom and an organic group having from 1 to 20 carbon atoms. Preferred examples of the organic group having from 1 to 20 carbon atoms include those described as the examples for $R^1$.

$Z^5$ represents a single bond, an oxygen atom, a sulfur atom or a divalent group selected from —$CH_2$—, —$C(CH_3)_2$—, —$CF_2$—, —$C(CF_3)_2$—, —$SO_2$—,

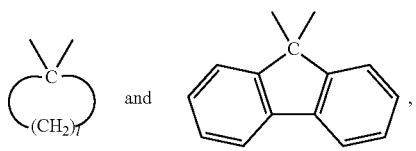

and wherein l represents an integer of from 2 to 10.

In the formula (6), $W^4$ and $W^5$ each independently contain an oxygen atom or a divalent group selected from —$O(CH_2CH_2O)_m$—, —$O[CH_2CH(CH_3)O]_n$—, and —$O[(CH_2)_5CO_2]_o$—, wherein m to o each independently represent an integer of from 1 to 10.

Examples of the trifunctional or higher functional (meth) acrylate include an aliphatic (meth)acrylate, an ethoxylated compound thereof, a propoxylated compound thereof, an ethoxylated propoxylated compound thereof and a caprolactone-modified compound thereof, such as trimethylolpropane tri(meth)acrylate, pentaerythritol tri(meth)acrylate, pentaerythritol tetra(meth)acrylate, ditrimethylolpropane tetra (meth)acrylate, dipentaerythritol penta(meth)acrylate and dipentaerythritol hexa(meth)acrylate; an aromatic epoxy (meth)acrylate, such as phenol novolak type epoxy(meth) acrylate and cresol novolak type epoxy poly(meth)acrylate; a heterocyclic(meth)acrylate, an ethoxylated compound thereof, a propoxylated compound thereof, an ethoxylated propoxylated compound thereof and a caprolactone-modified compound thereof, such as isocyanuric acid tri(meth)acrylate; and a heterocyclic epoxy(meth)acrylate, such as isocyanuric acid type epoxy(meth)acrylate. The ethoxylated compound, the propoxylated compound, the ethoxylated propoxylated compound and the caprolactone-modified compound have the same meanings as above.

Among these, the aforementioned aromatic epoxy(meth) acrylate, the aforementioned heterocyclic(meth)acrylate and the aforementioned isocyanuric acid type epoxy(meth)acrylate are preferred from the standpoint of transparency and heat resistance.

The (meth)acrylates may be used solely or as a combination of two or more thereof, and may be used as a combination with another polymerizable compound.

The amount of the polymerizable compound having an ethylenically unsaturated group (B) mixed is preferably from 10 to 90% by mass based on the total amount of the component (A) and the component (B). When the amount is 10% by mass or more, the compound may be sufficiently crosslinked with the polyhydroxy polyether having an ethylenically unsaturated group on a side chain and an aromatic ring on a main chain (A) upon curing, thereby preventing the developer solution resistance from being short, and when the amount is 90% by mass or less, the resin composition for forming an optical waveguide containing the polyhydroxy polyether (A) and the radical polymerization initiator (C) may be easily formed into a film. The amount of the component (B) mixed is more preferably from 20 to 85% by mass, and particularly preferably from 30 to 80% by mass, from these view points.

Radical Polymerization Initiator (C)

The radical polymerization initiator (C) is not particularly limited as far as it initiates radical polymerization through heating or irradiation with actinic ray, such as ultraviolet right and visible light, and examples thereof include a heat radical polymerization initiator and a photo radical polymerization initiator.

The heat radical polymerization initiator is not particularly limited, and examples thereof include a ketone peroxide, a peroxyketal, a hydroperoxide, a dialkyl peroxide, a diacyl peroxide, a peroxycarbonate, a peroxyester and an azo compound, which are disclosed in paragraph [0083] of WO 2007/105795.

Among these, the diacyl peroxide, the peroxyester and the azo compound are preferred from the standpoint of curing property, transparency and heat resistance.

The photo radical polymerization initiator is not particularly limited, and examples thereof include, as described in WO 2007/105795, in paragraph [0084], a benzoin ketal, an α-hydroxyketone, a glyoxy ester, an α-aminoketone, an oxime ester, a phosphine oxide, a 2,4,5-triarylimidazole dimer, a benzophenone compound, a quinone compound, a benzoin ether, a benzoin compound, a benzyl compound and an acridine compound, and also include N-phenylglycine and coumarin.

In the 2,4,5-triarylimidazole dimer, the substituents on the aryl groups of the triarylimidazole moiety may be the same as each other to provide a symmetric compound or may be different from each other to provide an asymmetric compound.

Among these, the α-hydroxyketone, the glyoxy ester, the oxime ester and the phosphine oxide are preferred from the standpoint of curing property and transparency.

1-[4-(2-Hydroxyethoxy)phenyl]-2-hydroxy-2-methyl-1-propan-1-one, which is one kind of the α-hydroxyketone, is particularly preferred, and is commercially available as Irgacure 2959 from Ciba Japan Co., Ltd.

Bis(2,4,6-trimethylbenzoyl)phenylphosphine oxide, which is one kind of the phosphine oxide, is particularly preferred, and is commercially available as Irgacure 819 from Ciba Japan Co., Ltd.

The radical polymerization initiators (including the heat radical polymerization initiators and the photo radical polymerization initiators) may be used solely or as a combination of two or more kinds thereof, and may be used in combination with a suitable sensitizer.

The amount of the radical polymerization initiator (C) mixed is preferably from 0.01 to 10 parts by mass based on 100 parts by mass of the total amount of the component (A) and the component (B). When the amount is 0.01 part by mass or more, the composition may be sufficiently cured, and when the amount is 10 parts by mass or less, sufficient light transmissibility may be obtained. The amount of the radical polymerization initiator (C) mixed is more preferably from 0.05 to 7 parts by mass, and particularly preferably from 0.1 to 5 parts by mass, from these view points.

Other Components

The resin composition for forming an optical waveguide of the present invention may further contain, depending on necessity, so-called additives, such as an antioxidant, a yellowing preventive, an UV absorber, a visible light absorber, a coloring agent, a plasticizer, a stabilizer and a filler, in such an amount that does not impair the advantages of the present invention.

Organic Solvent

The resin composition for forming an optical waveguide of the present invention may be diluted with a suitable organic solvent and used as a resin varnish for forming an optical waveguide. The organic solvent used herein is not particularly limited as far as it dissolves the resin composition, and examples thereof include an aromatic hydrocarbon, such as toluene, xylene, mesitylene, cumene and p-cymene; a linear ether, such as diethyl ether, tert-butyl methyl ether, cyclopentyl methyl ether and dibutyl ether; a cyclic ether, such as tetrahydrofuran and 1,4-dioxane; an alcohol, such as methanol, ethanol, isopropanol, butanol, ethylene glycol and propylene glycol; a ketone, such as acetone, methyl ethyl ketone, methyl isobutyl ketone, cyclohexanone and 4-hydroxy-4-methyl-2-pentanone; an ester, such as methyl acetate, ethyl acetate, butyl acetate, methyl lactate, ethyl lactate and γ-butyrolactone; a carbonate ester, such as ethylene carbonate and propylene carbonate; a polyhydric alcohol alkyl ether, such as ethylene glycol monomethyl ether, ethylene glycol monoethyl ether, ethylene glycol monobutyl ether, ethylene glycol dimethyl ether, ethylene glycol diethyl ether, propylene glycol monomethyl ether, propylene glycol monoethyl ether, propylene glycol dimethyl ether, propylene glycol diethyl ether, diethylene glycol monomethyl ether, diethylene glycol monoethyl ether, diethylene glycol monobutyl ether, diethylene glycol dimethyl ether and diethylene glycol diethyl ether; a polyhydric alcohol alkyl ether acetate, such as ethylene glycol monomethyl ether acetate, ethylene glycol monoethyl ether acetate, ethylene glycol monobutyl ether acetate, propylene glycol monomethyl ether acetate, propylene glycol monoethyl ether acetate, diethylene glycol monomethyl ether acetate and diethylene glycol monoethyl ether acetate; and an amide, such as N,N-dimethylformamide, N,N-dimethylacetamide and N-methylpyrrolidone.

The organic solvents may be used solely or as a combination of two or more kinds thereof. The solid concentration in the resin varnish is generally preferably from 10 to 80% by mass.

Preparation of Resin Composition for Forming Optical Waveguide

The resin composition for forming an optical waveguide is prepared preferably by mixing through stirring. The stirring method is not particularly limited and is preferably stirring with a propeller from the standpoint of stirring efficiency. The rotating speed of the propeller upon stirring is not particularly limited and is preferably from 10 to 1,000 rpm. When the rotating speed is 10 rpm or more, the components may be sufficiently mixed, and when the rotating speed is 1,000 rpm or less, entrainment of air bubbles by rotation of the propeller may be decreased. The rotating speed of the propeller is more preferably from 50 to 800 rpm, and particularly preferably from 100 to 500 rpm, from these points of view.

The stirring time is not particularly limited and is preferably from 1 to 24 hours. When the stirring time is 1 hour or more, the components may be sufficiently mixed, and when the stirring time is 24 hours or less, the preparation time may be shortened, thereby enhancing the productivity.

The resin composition for forming an optical waveguide thus prepared is preferably filtered with a filter having a pore diameter of 50 μm or less. The use of the filter having a pore diameter of 50 μm or less removes large foreign matters and the like, thereby preventing repelling from occurring, and suppresses scattering of light, thereby preventing the transparency from being deteriorated. The resin composition is more preferably filtered with a filter having a pore diameter of 30 μm or less, and particularly preferably with a filter having a pore diameter of 10 μm or less, from these points of view.

The resin composition for forming an optical waveguide thus prepared is preferably defoamed under reduced pressure. The deaeration method is not particularly limited, and examples thereof include methods using a vacuum pump and a bell jar, or a deaeration equipment having a vacuuming device. The reduced pressure is not particularly limited and is preferably such a pressure that the low boiling point components contained in the resin composition do not boil. The deaeration time is not particularly limited and is preferably from 3 to 60 minutes. When the deaeration time is 3 minutes or more, gas bubbles dissolved in the resin composition may be removed, and when the deaeration time is 60 minutes or less, the deaeration time may be shortened without evaporation of the organic solvent contained in the resin composition, thereby enhancing the productivity.

Resin Film for Forming Optical Waveguide

The resin film for forming an optical waveguide of the present invention contains the resin composition for forming an optical waveguide, and may be easily produced by coating the resin composition for forming an optical waveguide containing the components (A) to (C) on a suitable supporting film. In the case where the resin composition for forming an optical waveguide is the resin varnish for forming an optical waveguide diluted with an organic solvent, the resin film for forming an optical waveguide may be easily produced by coating the resin varnish on a supporting film and then removing the organic solvent.

The supporting film is not particularly limited, and examples thereof include polyester, such as polyethylene terephthalate, polybutylene terephthalate and polyethylene naphthalate; polyolefin, such as polyethyelne and polypropylene; polycarbonate, polyamide, polyimide, polyamideimide, polyether imide, polyether sulfide, polyether sulfone, polyether ketone, polyphenylene ether, polyphenylene sulfide, polyarylate, polysulfone and a liquid crystal polymer. Among these, polyethylene terephthalate, polybutylene terephthalate, polyethylene naphtha late, polypropylene, polycarbonate, polyamide, polyimide, polyamideimide, polyphenylene ether, polyphenylene sulfide, polylarylate and polysulfone are preferred from the standpoint of flexibility and toughness.

A film having been subjected to a mold release treatment with a silicone compound, a fluorine-containing compound or the like may be used depending on necessity from the standpoint of enhancement of the peeling property to the resin layer.

The thickness of the supporting film may be changed appropriately depending on the target flexibility, and is preferably from 3 to 250 μm. When the thickness is 3 μm or more, the film may have sufficient strength, and when the thickness is 250 μm or less, the film may have sufficient flexibility. The thickness of the supporting film is more preferably from 5 to 200 μm, and particularly preferably from 7 to 150 μm, from these points of view.

The resin film for forming an optical waveguide thus produced by coating the resin composition for forming an optical waveguide on the supporting film may have a three-layer structure containing the supporting film, the resin layer and a protective film by attaching the protective film to the resin layer depending on necessity.

The protective film is not particularly limited, and preferred examples thereof from the standpoint of flexibility and toughness include polyester, such as polyethylene terephthalate, polybutylene terephthalate and polyethylene naphthalate; and polyolefin, such as polyethylene and polypropylene. A film having been subjected to a mold release treatment with a silicone compound, a fluorine-containing compound or the like may be used depending on necessity from the standpoint of enhancement of the peeling property to the resin layer.

The thickness of the protective film may be changed appropriately depending on the target flexibility, and is preferably from 10 to 250 μm. When the thickness is 10 μm or more, the film may have sufficient strength, and when the thickness is 250 μm or less, the film may have sufficient flexibility. The thickness of the protective film is more preferably from 15 to 200 μm, and particularly preferably from 20 to 150 μm, from these points of view.

The thickness of the resin layer of the resin film for forming an optical waveguide of the present invention is not particularly limited and is generally preferably from 5 to 500 μm in terms of thickness after drying. When the thickness is 5 μm or more, the resin film or a cured product of the resin film may have sufficient strength owing to the sufficient thickness, and when the thickness is 500 μm or less, the film may be sufficiently dried, thereby preventing the amount of the solvent remaining in the resin film from being increased, and gas bubbles may be prevented from being generated upon heating the cured product of the resin film.

The resin film for forming an optical waveguide thus obtained may be easily stored, for example, by winding in a roll form. The film in a roll form may be stored after cutting into a sheet with a suitable size.

Resin Film for Forming Optical Waveguide

An application example in the case where the resin film for forming an optical waveguide of the present invention is applied to a resin film for forming an optical waveguide, which is the most preferred usage thereof, is described below.

The supporting film used in the production process of the resin film for forming the core part is not particularly limited as far as the film transmits actinic ray for exposure used for forming a core pattern, and examples thereof include polyester, such as polyethylene terephthalate, polybutylene terephthalate and polyethylene naphthalate; polyolefin, such as polyethyelne and polypropylene; polycarbonate, polyamide, polyimide, polyamideimide, polyether imide, polyether sulfide, polyether sulfone, polyether ketone, polyphenylene ether, polyphenylene sulfide, polyarylate, polysulfone and a liquid crystal polymer.

Among these, the polyester and the polyolefin are preferred from the standpoint of transmissibility of the actinic ray for exposure, flexibility and toughness. Furthermore, a supporting film having high transparency is preferably used from the standpoint of enhancement of the transmissibility of the actinic ray for exposure and reduction of roughening on the side wall of the core pattern. Examples of the supporting film having high transparency include "Cosmoshine A1517" and "Cosmoshine A4100", trade names, produced by Toyobo Co., Ltd.

A film having been subjected to a mold release treatment with a silicone compound, a fluorine-containing compound or the like may be used depending on necessity from the standpoint of enhancement of the peeling property to the resin layer.

The thickness of the supporting film of the resin film for forming the core part is preferably from 5 to 50 μm. When the thickness is 5 μm or more, the support may have sufficient strength, and when the thickness is 50 μm or less, the distance between the photomask and the resin layer for forming the core part may not be increased upon forming the core pattern, thereby providing favorable pattern resolution. The thickness of the supporting film is more preferably from 10 to 40 μm, and particularly preferably from 15 to 30 μm, from these points of view.

Optical Waveguide

The optical waveguide of the present invention is described below.

FIG. 1(a) shows a cross sectional view of an optical waveguide. The optical waveguide 1 is formed on a substrate 5, and is constituted by a core part 2 formed of a resin composition for forming a core part having a high refractive index, and a lower cladding layer 4 and an upper cladding layer 3 each formed of a resin composition for forming a cladding layer having a low refractive index.

The resin composition for forming an optical waveguide and the resin film for forming an optical waveguide of the present invention is preferably used as at least one of the lower cladding layer 4, the core part 2 and the upper cladding layer 3 of the optical waveguide 1.

The use of the resin film for forming an optical waveguide enhances the flatness of the layers, the interlayer adhesiveness between the clad and the core, and the resolution upon forming the core pattern of the optical waveguide (i.e., the performance on thin lines or narrow line gaps), thereby forming a fine pattern excellent in flatness having small line width and line gaps.

The material of the substrate 5 in the optical waveguide 1 is not particularly limited, and examples thereof include a glass-epoxy resin substrate, a ceramic substrate, a glass substrate, a silicon substrate, a plastic substrate, a metal substrate, a substrate having a resin layer, a substrate having a metal layer, a plastic film, a plastic film having a resin layer, and a plastic film having a metal layer.

The optical waveguide 1 may be a flexible optical waveguide by using a substrate having flexibility and toughness, for example, the supporting film for the resin film for forming an optical waveguide, as the substrate 5, and in this case, the substrate 5 may be used as the protective film of the optical waveguide 1. The protective film provided may impart the flexibility and toughness of the protective film to the optical waveguide 1, and furthermore may prevent the optical waveguide 1 from being contaminated and damaged, thereby enhancing the handleability.

In view of these points, the substrate 5 may be disposed as the protective film outside the upper cladding layer 3, as shown in FIG. 1(b), and the substrates 5 may be disposed as the protective films outside both the lower cladding layer 4 and the upper cladding layer 3, as shown in FIG. 1(c).

In the case where the optical waveguide 1 has sufficient flexibility and toughness, no protective film 5 may be provided, as shown in FIG. 1(d).

The thickness of the lower cladding layer 4 is not particularly limited and is preferably from 2 to 200 μm. When the thickness is 2 μm or more, the propagating light may be easily confined inside the core, and when the thickness is 200 μm or less, the total thickness of the optical waveguide 1 may be prevented from being too large. The thickness of the lower cladding layer 4 herein is a value from the interface between the core part 2 and the lower cladding layer 4 to the lower surface of the lower cladding layer 4.

The thickness of the resin film for forming the lower cladding layer is not particularly limited and may be controlled in such a manner that the thickness of the lower cladding layer 4 after curing is in the aforementioned range.

The height of the core part 2 is not particularly limited and is preferably from 10 to 150 μm. When the height of the core part is 10 μm or more, the positioning tolerance upon coupling with a light receiving or emitting device or an optical fiber after fabricating the optical waveguide may be prevented from being decreased, and when the height is 150 μm or less, the coupling efficiency upon coupling with a light receiving or emitting device or an optical fiber after fabricating the optical waveguide may be prevented from being decreased. The height of the core part is more preferably from 15 to 130 μm, and particularly preferably from 20 to 120 μm, from these points of view. The thickness of the resin film for forming the core part is not particularly limited and may be controlled in such a manner that the height of the core part after curing is in the aforementioned range.

The thickness of the upper cladding layer 3 is not particularly limited as far as the core part 2 is embedded therein, and is preferably from 12 to 500 μm in terms of thickness after drying. The thickness of the upper cladding layer 3 may be the same as or different from the thickness of the lower cladding layer 4 firstly formed, and is preferably thicker than the lower cladding layer 4 from the standpoint of embedding the core part 2. The thickness of the upper cladding layer 3 herein is a value from the interface between the core part 2 and the lower cladding layer 4 to the upper surface of the upper cladding layer 3.

The optical waveguide of the present invention preferably has an optical transmission loss of 0.3 dB/cm or less. When the optical transmission loss is 0.3 dB/cm or less, the loss of light is small, thereby providing transmitted signal with sufficient intensity. The optical transmission loss is more preferably 0.2 dB/cm or less, and particularly preferably 0.1 dB/cm or less, from these points of view.

The optical waveguide of the present invention preferably has an optical transmission loss of 0.3 dB/cm or less after performing a high temperature and high humidity shelf test at a temperature of 85° C. and a humidity of 85% for 1,000 hours. When the optical transmission loss is 0.3 dB/cm or less, the loss of light is small, thereby providing transmitted signal with sufficient intensity. The optical transmission loss is more preferably 0.2 dB/cm or less, and particularly preferably 0.1 dB/cm or less, from these points of view.

The high temperature and high humidity shelf test at a temperature of 85° C. and a humidity of 85% means a high temperature and high humidity shelf test performed under conditions according to the JPCA Standard (JPCA-PE02-05-01S).

The optical waveguide of the present invention preferably has an optical transmission loss of 0.3 dB/cm or less after performing a temperature cycle test between temperatures of −55° C. and 125° C. in 1,000 cycles. When the optical transmission loss is 0.3 dB/cm or less, the loss of light is small, thereby providing transmitted signal with sufficient intensity. The optical transmission loss is more preferably 0.2 dB/cm or less, and particularly preferably 0.1 dB/cm or less, from these points of view.

The temperature cycle test between temperatures of −55° C. and 125° C. is a temperature cycle test performed under conditions according to the JPCA Standard (JPCA-PE02-05-01S).

The optical waveguide of the present invention preferably has an optical transmission loss of 0.3 dB/cm or less after performing a reflow test with a maximum temperature of 265° C. three times. When the optical transmission loss is 0.3 dB/cm or less, the loss of light is small, thereby providing transmitted signal with sufficient intensity, and simultaneously the component mounting may be performed by a reflow process, thereby enhancing the applicable scope thereof. The optical transmission loss is more preferably 0.2 dB/cm or less, and particularly preferably 0.1 dB/cm or less, from these points of view.

The reflow test with a maximum temperature of 265° C. is a lead-free solder reflow test performed under conditions according to the JEDEC Standard (JEDEC JESD22A113E).

The optical waveguide of the present invention is excellent in transparency, reliability and heat resistance, and may be used as a light transmission path of an optical module. Examples of the configuration of the optical module include an optical waveguide with optical fibers having optical fibers connected to both ends of an optical waveguide, an optical waveguide with connectors having connectors connected to both ends of an optical waveguide, an optoelectronic board having an optical waveguide and a printed wiring board formed into a complex, an optoelectronic conversion module having an optical waveguide and an optoelectronic conversion device converting light signal and electric signal mutually combined with each other, and a wavelength multiplexer/separator having an optical waveguide and a wavelength division filter combined with each other.

The printed wiring board, which is formed into a complex in the optoelectronic board is not particularly limited, and examples thereof include a rigid substrate, such as a glass-epoxy substrate and a ceramic substrate, and a flexible substrate, such as a polyimide substrate and a polyethylene terephthalate substrate.

Production Method of Optical Waveguide

A production method for forming the optical waveguide 1 by using the resin composition for forming an optical waveguide and/or the resin film for forming an optical waveguide of the present invention is described below.

The method for producing the optical waveguide 1 of the present invention is not particularly limited, and examples thereof include a production method of forming a resin layer for forming an optical waveguide on a substrate by using the resin composition for forming an optical waveguide and/or the resin film for forming an optical waveguide.

The substrate used in the present invention is not particularly limited, and examples thereof include a glass-epoxy resin substrate, a ceramic substrate, a glass substrate, a silicon substrate, a plastic substrate, a metal substrate, a substrate having a resin layer, a substrate having a metal layer, a plastic film, a plastic film having a resin layer, and a plastic film having a metal layer.

The method for forming the resin layer for forming an optical waveguide is not particularly limited, and examples thereof include a method of coating the resin composition for forming an optical waveguide by a spin coating method, a dip coating method, a spraying method, a bar coating method, a roll coating method, a curtain coating method, a gravure coating method, a screen coating method, an ink-jet coating method or the like.

In the case where the resin composition for forming an optical waveguide is in the form of the resin varnish for forming an optical waveguide by diluting with an organic solvent, a drying step may be employed depending on necessity after forming the resin layer. The drying method is not particularly limited, and examples thereof include drying by heating and drying under reduced pressure, which may be used in combination depending on necessity.

Examples of the method for forming the resin layer for forming an optical waveguide also include a method using a lamination method by using the resin film for forming an optical waveguide using the resin composition for forming an optical waveguide.

Among these, a production method by a lamination method by using the resin film for forming an optical waveguide is preferred since such an optical waveguide may be produced that has a fine pattern excellent in flatness having small line width and line gaps.

The production method of forming the optical waveguide 1 by using the resin films for forming an optical waveguide as the lower cladding layer, the core part and the upper cladding layer is described below, but the present invention is not limited thereto.

As a first step, a resin film for forming a lower cladding layer is laminated on a substrate 5. The lamination method in the first step is not particularly limited, and examples thereof include a lamination method of adhering by pressing under heating by using a roll laminator or a flat laminator. The flat laminator in the present invention means a laminator, in which lamination materials are held between a pair of flat plates and adhered under pressure by applying pressure to the flat plates, and preferred examples thereof include a vacuum pressure laminator. The lamination temperature is not particularly limited and is preferably from 20 to 130° C., and the lamination pressure is not particularly limited and is preferably from 0.1 to 1.0 MPa. In the case where the resin film for forming the lower cladding layer has a protective film, the resin film may be laminated after removing the protective film.

In the case where the lamination is performed with a vacuum pressure laminator, the resin film for forming the lower cladding layer may be temporarily attached onto the substrate 5 in advance with a roll laminator. In this case, the resin film is preferably temporarily attached under pressure from the standpoint of enhancement of the adhesiveness and the followability, and may be temporarily attached thereto under heating by using a laminator having a heat roll. The lamination temperature is preferably from 20 to 130° C. When the lamination temperature is 20° C. or more, the adhesiveness between the resin film for forming the lower cladding layer and the substrate 5 may be enhanced, and when the lamination temperature is 130° C. or less, the resin layer may be prevented from being fluidized excessively upon roll lamination, and thereby a target thickness may be obtained. The lamination temperature is more preferably from 40 to 100° C. from these points of view. The lamination pressure is not particularly limited and is preferably from 0.2 to 0.9 MPa, and the lamination speed is not particularly limited and is preferably from 0.1 to 3 m/min.

The resin layer for forming the lower cladding layer thus laminated on the substrate 5 is cured with light and/or heat to form the lower cladding layer 4. The supporting film of the resin film for forming the lower cladding layer may be removed before curing or after curing.

The radiation dose of the actinic ray upon curing the resin layer for forming the lower cladding layer with light is not particularly limited and is preferably from 0.1 to 5 J/cm$^2$. In the case where the substrate transmits the actinic ray, for the purpose of efficient curing, a double sided exposing device capable of radiating the actinic ray from both sides of the resin film simultaneously may be used. The resin layer may be irradiated with the actinic ray under heating. The resin layer may be subjected to a heat treatment at from 50 to 200° C. depending on necessity before or after the curing with light.

The heating temperature upon curing the resin layer for forming the lower cladding layer by heating is not particularly limited and is preferably from 50 to 200° C.

In the case where the supporting film of the resin film for forming the lower cladding layer is used as the protective film 5 of the optical waveguide 1, the resin film for forming the lower cladding layer may be cured with light and/or heat under the aforementioned conditions without lamination, thereby forming the lower cladding layer 4.

The protective film of the resin film for forming the lower cladding layer may be removed before curing or after curing.

As a second step, a resin film for forming a core part is laminated on the lower cladding layer 4 in the similar manner as in the first step. The resin layer for forming the core layer is designed to have a higher refractive index than the resin layer for forming the lower cladding layer, and is preferably formed of a photosensitive resin composition capable of forming the core part 2 (core pattern) with actinic ray.

As a third step, the core part 2 is exposed. The exposing method of the core part 2 is not particularly limited, and examples thereof include a method of radiating actinic ray imagewise through a negative photomask, which is referred to as an art work, and a method of radiating actinic ray imagewise directly by using a laser direct drawing method without the use of a negative photomask.

The light source of the actinic ray is not particularly limited, and examples thereof include a light source that effectively radiates an ultraviolet ray, such as a ultra-high pressure mercury lamp, a high pressure mercury lamp, a mercury vapor arc lamp, a metal halide lamp, a xenon lamp and a carbon arc lamp, and a light source that effectively radiates visible light, such as a photographic flood lamp and a sun lamp.

The radiation dose of the actinic ray for exposing the core part 2 is preferably from 0.01 to 10 J/cm$^2$. When the radiation dose is 0.01 J/cm$^2$ or more, the curing reaction proceeds sufficiently, thereby preventing the core part 2 from being washed out upon developing. When the radiation dose is 10 J/cm$^2$ or less, the core part 2 is prevented from being thickened due to an excessive exposure amount, thereby forming a fine pattern preferably. The radiation dose of the actinic ray is more preferably from 0.03 to 5 J/cm$^2$, and particularly preferably from 0.05 to 3 J/cm$^2$, from these points of view.

The core part 2 may be exposed through the supporting film of the resin film for forming the core part or may be exposed after removing the supporting film.

After the exposure, the core part 2 may be subjected to post-exposure heating depending on necessity from the standpoint of enhancement of the resolution and the adhesiveness thereof. The period of time from the ultraviolet ray irradiation to the post-exposure heating is preferably 10 minutes or less, but the conditions are not particularly limited. The heating temperature of the post-exposure heating is preferably from 40 to 160° C., and the time thereof is preferably from 30 seconds to 10 minutes, but the conditions are not particularly limited.

In the case where the core part is exposed through the supporting film of the resin film for forming the core part, the supporting film is removed, and then as a fourth step, the resin layer for forming the core part is developed by using a developer solution suitable for the formulation of the resin layer.

The developing method is not particularly limited, and examples thereof include a spraying method, a dipping method, a paddling method, a spinning method, a brushing method and a scrubbing method. These developing methods may be used in combination depending on necessity.

The developer solution is not particularly limited, and examples thereof include an organic solvent developer solution, such as an organic solvent and a quasi-aqueous developer solution containing an organic solvent and water, and an alkaline developer solution, such as an alkaline aqueous solution and an alkaline quasi-aqueous developer solution containing an alkaline aqueous solution and at least one organic solvent.

The developing temperature may be controlled corresponding to the developing property of the resin layer for forming the core part.

The organic solvent is not particularly limited, and for example, the similar organic solvents as used for diluting the resin composition for forming an optical waveguide may be used.

The organic solvents may be used solely or as a combination of two or more kinds thereof. The organic solvent may contain a surfactant, a defoaming agent and the like.

The quasi-aqueous developer solution is not particularly limited as far as it contains at least one organic solvent and water.

The concentration of the organic solvent is generally preferably from 2 to 90% by mass. The quasi-aqueous developer solution may contain a small amount of a surfactant, a defoaming agent and the like.

The base of the alkaline aqueous solution is not particularly limited, and examples thereof include an alkali metal hydroxide, such as lithium hydroxide, sodium hydroxide and potassium hydroxide; an alkali metal carbonate salt, such as lithium carbonate, sodium carbonate and potassium carbonate; an alkali metal hydrogen carbonate salt, such as lithium hydrogen carbonate, sodium hydrogen carbonate and potassium hydrogen carbonate; an alkali metal phosphate salt, such as potassium phosphate and sodium phosphate; an alkali metal pyrophosphate salt, such as sodium pyrophosphate and potassium pyrophosphate; a sodium salt, such as sodium tetraborate and sodium metasilicate; an ammonium salt, such as ammonium carbonate and ammonium hydrogen carbonate; and an organic base, such as tetramethylammonium hydroxide, triethanolamine, ethylenediamine, diethylenetriamine, 2-amino-2-hydroxymethyl-1,3-propanediol and 1,3-diaminopropanol-2-morpholine.

These bases may be used solely or as a combination of two or more kinds thereof.

The pH of the alkali aqueous solution used for developing is preferably from 9 to 14. The alkali aqueous solution may contain a surfactant, a defoaming agent and the like.

The alkaline quasi-aqueous developer solution is not particularly limited as far as it contains an alkaline aqueous solution and at least one of the aforementioned organic solvents. The pH of the alkaline quasi-aqueous developer solution is preferably as small as possible in a range where the development is sufficiently performed, and is preferably from 8 to 13, and more preferably from 9 to 12.

The concentration of the organic solvent is generally preferably from 2 to 90% by mass. The alkaline quasi-aqueous developer solution may contain a small amount of a surfactant, a defoaming agent and the like.

As a process after the development, the core part may be rinsed with the organic solvent, a quasi-aqueous rinsing solution containing the organic solvent and water, or water.

The rinsing method is not particularly limited, and examples thereof include a spraying method, a dipping method, a paddling method, a spinning method, a brushing method and a scrubbing method. These rinsing methods may be used in combination depending on necessity.

The organic solvent may be used solely or as a combination of two or more kinds thereof. In the quasi-aqueous rinsing solution, the concentration of the organic solvent is preferably from 2 to 90% by mass. The rinsing temperature may be controlled corresponding to the developing property of the resin layer for forming the core part.

As a process after the development or the rinsing, the core part 2 may be exposed and/or heated depending on necessity from the standpoint of enhancement of the curing property and the adhesiveness of the core part 2. The heating temperature is not particularly limited and is preferably from 40 to 200° C., and the radiation dose of the actinic ray is not particularly limited and is preferably from 0.01 to 10 $J/cm^2$.

As a fifth step, a resin film for forming an upper cladding layer is laminated on the lower cladding layer 4 and the core part 2 in the similar manner as in the first and second steps. The resin layer for forming the upper cladding layer is designed to have a lower refractive index than the resin layer for forming the core part. The thickness of the resin layer for forming the upper cladding layer is preferably larger than the height of the core part 2.

Subsequently, the resin layer for forming the upper cladding layer is cured with light and/or heat in the similar manner as in the step 1 to form the upper cladding layer 3.

The radiation dose of the actinic ray upon curing the resin layer for forming the upper cladding layer with light is not particularly limited and is preferably from 0.1 to 30 $J/cm^2$. In the case where the substrate transmits the actinic ray, for the purpose of efficient curing, a double sided exposing device capable of radiating the actinic ray from both sides of the resin film simultaneously may be used. The resin layer may be irradiated with the actinic ray under heating depending on necessity, and may be subjected to a heat treatment as a treatment before or after curing with light. The heating temperature during irradiation with actinic ray and/or after irradiation with actinic ray is not particularly limited and is preferably from 50 to 200° C.

The heating temperature upon curing the resin layer for forming the upper cladding layer by heating is not particularly limited and is preferably from 50 to 200° C.

In the case where the supporting film of the resin film for forming the upper cladding layer is necessarily removed, the supporting film may be removed before curing or after curing.

The optical waveguide 1 is thus produced according to the aforementioned process steps.

EXAMPLE

The present invention is described more specifically with reference to examples below, but the invention is not limited to the examples in any way.

Synthesis Example 1

Production of Polyhydroxy Polyether A-1 Having Ethylenically Unsaturated Group on Side Chain and Aromatic Ring on Main Chain 150 parts by mass of a polyhydroxy polyether having a skeleton derived from bisphenol A and bisphenol F as a main chain ("Phenotohto YP-70", a trade name, produced by Tohto Kasei Co., Ltd., weight average molecular weight: $5.0 \times 10^4$ to $6.0 \times 10^4$, catalog value) and 191 parts by mass of cyclohexanone were placed in a flask equipped with an agitator, a condenser, a gas introduction tube, a dropping funnel and a thermometer, and the polyhydroxy polyether is dissolved by agitating at 100° C. while introducing nitrogen gas. After cooling to room temperature, 0.09 part by mass of hydroquinone monomethyl ether and 0.07 part by mass of dibutyltin dilaurate were added thereto, and a mixture of 17 parts by mass of 2-methacryloyloxyethylisocyanate and 14 parts by mass of cyclohexanone was added dropwise thereto at 50° C. over 30 minutes while introducing the air. Thereafter, the mixture was agitated at 50° C. for 5 hours, thereby providing a solution of a polyhydroxy polyether A-1 having an ethylenically unsaturated group on a side chain and a skeleton derived from bisphenol A and bisphenol F as a main chain (solid content: 45% by mass).

Measurement of Weight Average Molecular Weight

The weight average molecular weight (standard polystyrene conversion) of A-1 measured with GPC (SD-8022/DP-8020/RI-8020, produced by Tosoh Corporation) was 43,100. The columns used were Gelpack GL-A150-S/GL-A160-S, produced by Hitachi Chemical Co., Ltd.

Synthesis Example 2

Production of Polyhydroxy Polyether A-2 Having Ethylenically Unsaturated Group on Side Chain and Aromatic Ring on Main Chain 150 parts by mass of a polyhydroxy polyether having a skeleton derived from bisphenol A and bisphenol F as a main chain ("Phenotohto YP-70", a trade name, produced by Tohto Kasei Co., Ltd.) and 187 parts by mass of cyclohexanone were placed in a flask equipped with an agitator, a condenser, a gas introduction tube, a dropping funnel and a thermometer, and the polyhydroxy polyether is dissolved by agitating at 100° C. while introducing nitrogen gas. After cooling to room temperature, 0.04 part by mass of hydroquinone monomethyl ether and 0.04 part by mass of dibutyltin dilaurate were added thereto, and a mixture of 9 parts by mass of 2-methacryloyloxyethylisocyanate and 7 parts by mass of cyclohexanone was added dropwise thereto at 50° C. over 30 minutes while introducing the air. Thereafter, the mixture was agitated at 50° C. for 5 hours, thereby providing a solution of a polyhydroxy polyether A-2 having an ethylenically unsaturated group on a side chain and a skeleton derived from bisphenol A and bisphenol F as a main chain (solid content: 45% by mass).

The weight average molecular weight of A-2 measured in the same manner as in Synthesis Example 1 was 42,100.

Synthesis Example 3

Production of Urethane Acrylate UA-1

104 parts by mass of polytetramethylene glycol, 0.2 part by mass of diethylene glycol, 55 parts by mass of caprolactone-modified 2-hydroxyethyl acrylate (Placcel FA2D, produced by Daicel Chemical Industries, Ltd.), 0.1 part by mass of hydroquinone monomethyl ether and 0.06 part by mass of dibutyltin dilaurate were placed in a flask equipped with an agitator, a condenser, a gas introduction tube, a dropping funnel and a thermometer, and 44 parts by mass of isophoronediisocyanate was added dropwise thereto at 70° C. for 2 hours while introducing the air. Thereafter, the mixture was agitated at 70° C. for 5 hours, thereby providing a urethane acrylate UA-1.

The weight average molecular weight of UA-1 measured in the same manner as in Synthesis Example 1 was 10,000.

Synthesis Example 4

Production of (Meth)acrylic Polymer P-1

94 parts by mass of methyl ethyl ketone was weighed in a flask equipped with an agitator, a condenser, a gas introduction tube, a dropping funnel and a thermometer, and a mixture of 15 parts by mass of dicyclopentanyl methacrylate, 62 parts by mass of benzyl methacrylate, 12 parts by mass of methyl methacrylate, 14 parts by mass of 2-hydroxyethyl methacrylate, 0.8 part of 2,2'-azobis(2,4-dimethylvaleronitrile) and 63 parts by mass of methyl ethyl ketone was added dropwise thereto at 55° C. over 3 hours while introducing nitrogen gas. The mixture was agitated at 55° C. for 5 hours, and further continuously agitated at 80° C. for 2 hours.

After cooling to room temperature, 0.06 part by mass of dibutyltin dilaurate was added thereto, and a mixture of 16 parts by mass of 2-methacryloyloxyethylisocyanate and 10 parts by mass of methyl ethyl ketone was added dropwise thereto at 50° C. over 30 minutes while introducing the air. Thereafter, the mixture was agitated at 50° C. for 3 hours, thereby providing a solution of a (meth)acrylic polymer P-1 (solid content: 42% by mass).

The weight average molecular weight of P-1 measured in the same manner as in Synthesis Example 1 was 54,000.

Example 1

Preparation of Resin Composition for Forming Core Part COV-1

67 parts by mass (solid content: 30 parts by mass) of the A-1 solution (solid content: 45% by mass) as the component (A); 30 parts by mass of ethoxylated bisphenol A diacrylate (Fancryl FA-321A, produced by Hitachi Chemical Co., Ltd.), 29 parts by mass (solid content: 20 parts by mass) of a propylene glycol monomethyl ether acetate solution of ethoxylated fluorene type bisphenol diacrylate (NK Ester A-BPEF/PGMAC70, produced by Shin-Nakamura Chemical Co., Ltd., solid content: 70% by mass) and 20 parts by mass of bisphenol A type epoxy diacrylate (NK Oligo EA-1020, produced by Shin-Nakamura Chemical Co., Ltd.) as the component (B); 1 part by mass of 1-[4-(2-hydroxyethoxy)-phenyl]-2-hydroxy-2-methyl-1-propan-1-one (Irgacure 2959, produced by Ciba Japan Co., Ltd.) and 1 part by mass of bis(2,4,6-trimethylbenzoyl)phenylphosphine oxide (Irgacure 819, produced by Ciba Japan Co., Ltd.) as the component (C); and 22 parts by mass of propylene glycol monomethyl ether acetate as a diluent were mixed by stirring. The mixture was filtered under pressure with a Polyflon filter with a pore size of 2 μm (PF020, a trade name, produced by Advantec Toyo Co., Ltd.), and then defoamed under reduced pressure, thereby providing a resin composition for forming a core part COV-1.

Production of Resin Film for Forming Core Part COF-1

The resin composition for forming a core part COV-1 was coated on a non-treated surface of a PET film (Cosmoshine A1517, produced by Toyobo Co., Ltd., thickness: 16 μm) with a coating machine (Multicoater TM-MC, produced by Hirano Tecseed Co., Ltd.) and dried at 100° C. for 20 minutes, and then a PET film with a surface having been subjected to a mold release treatment (Purex A31, produced by Teijin DuPont Films Japan Ltd., thickness: 25 μm) as a protective film was then attached thereto, thereby providing a resin film for forming a core part COF-1. The thickness of the resin layer may be arbitrarily controlled by changing the gap of the coating machine. In the example, the coating machine was controlled to provide a thickness of 70 µm for the cured resin film for forming a core part and a thickness of 50 µm for a cured film for a tensile test.

Production of Cured Film for Tensile Test

The resin film for forming a core part COF-1, from which the protective film (A31) had been removed, was laminated to the resin film for forming a core part COF-1, from which the protective film (A31) had been removed, with a roll laminator (HLM-1500, produced by Hitachi Chemical Technoplant Co., Ltd.) under conditions of a pressure of 0.4 MPa, a temperature of 50° C. and a speed of 0.4 m/min. The laminated product was irradiated with an ultraviolet ray (wavelength: 365 nm) to 2,000 mJ/cm$^2$ with an ultraviolet ray exposing machine (MAP-1200-L, produced by Dainippon Screen Mfg. Co., Ltd.). The supporting film (A1517) was removed, and then the laminated product was heat-treated at 160° C. for 1 hour, thereby providing a cured film having a thickness of 100 µm.

Tensile Test

The resulting cured film was cut into a width of 10 mm and a length of 70 mm and subjected to a tensile test with a tensile tester (RTM-100, produced by Orientec Co., Ltd.) at a temperature of 25° C. and a tensile speed of 5 mm/min according to JIS K7127 (chuck distance: 50 mm).

(1) Tensile Elastic Modulus

The tensile elastic modulus was calculated from the initial linear portion of the tensile stress-distortion curve according to the following equation.

tensile elastic modulus(MPa)=difference in stress between two points on straight line(N)/original average cross sectional area of cured film(mm$^2$)/difference in distortion between the two points (2) Breaking Elongation The breaking elongation was calculated according to the following equation.

breaking elongation(%)=(chuck distance on breakage (mm)−initial chuck distance(mm))/initial chuck distance(mm)×100

Preparation of Resin Composition for Forming Cladding Layer CLV-1

500 parts by mass (solid content: 60 parts by mass) of a cyclohexanone solution of epoxy group-containing acrylic rubber (HTR-860P-3, produced by Nagase Chemtex Corporation, weight average molecular weight: 800,000, solid content: 12% by mass), 20 parts by mass of UA-1 produced in Synthesis Example 3, 20 parts by mass of dipentaerythritol hexaacrylate (Light-Acrylate DPE-6A, produced by Kyoeisha Chemical Co., Ltd.), 1 part by mass of 1-[4-(2-hydroxyethoxy)phenyl]-2-hydroxy-2-methyl-1-propan-1-one (Irgacure 2959, produced by Ciba Japan Co., Ltd.) and 1 part by mass of bis(2,4,6-trimethylbenzoyl)phenylphosphine oxide (Irgacure 819, produced by Ciba Japan Co., Ltd.) were mixed by stirring. The mixture was filtered under pressure with a Polyflon filter with a pore size of 2 µm (PF020, a trade name, produced by Advantec Toyo Co., Ltd.), and then defoamed under reduced pressure, thereby providing a resin composition for forming a cladding layer CLV-1.

Production of Resin Film for Forming Cladding Layer CLF-1

The resin composition for forming a cladding layer CLV-1 was coated on a non-treated surface of a PET film (Cosmoshine A4100, produced by Toyobo Co., Ltd., thickness: 50 µm) with the aforementioned coating machine and dried at 100° C. for 20 minutes, and then a PET film with a surface having been subjected to a mold release treatment (Purex A31, produced by Teijin DuPont Films Japan Ltd., thickness: 25 µm) as a protective film was then attached thereto, thereby providing a resin film for forming a cladding layer CLF-1. The thickness of the resin layer may be arbitrarily controlled by changing the gap of the coating machine. In the example, the coating machine was controlled to provide a thickness of 20 µm for the cured resin film for forming a lower cladding layer and a thickness of 80 µm for the cured resin film for an upper cladding layer.

Production of Flexible Optical Waveguide

The resin film for forming a lower cladding layer CLF-1 was irradiated with an ultraviolet ray (wavelength: 365 nm) to 4,000 mJ/cm$^2$ with the aforementioned ultraviolet ray exposing machine, and then the protective film (Purex A31) was removed, thereby providing a lower cladding layer.

Subsequently, the resin film for forming a core part COF-1, from which the protective film (Purex A31) had been removed, was laminated on the lower cladding layer with the aforementioned roll laminator under conditions of a pressure of 0.4 MPa, a temperature of 50° C. and a speed of 0.4 m/min. The laminated product was irradiated with an ultraviolet ray (wavelength: 365 nm) to 1,000 mJ/cm$^2$ through a negative photomask with a line width of 80 µm with the aforementioned ultraviolet ray exposing machine, and then subjected to post-exposure heating at 80° C. for 5 minutes. After removing the supporting film (Cosmoshine A1517), the core part was developed with a developer solution (propylene glycol monomethyl ether acetate/N,N-dimethylacetamide ratio: 70/30 by mass), then rinsed with propylene glycol monomethyl ether and then with 2-propanol, and dried by heating to 80° C. for 10 minutes and 100° C. for 10 minutes.

The resin film for forming an upper cladding layer CLF-1, from which the protective film (Purex A31) had been removed, was laminated on the core part and the lower cladding layer with a vacuum pressure laminator (MVLP-500/600, produced by Meiki Co., Ltd.) under conditions of a pressure of 0.4 MPa, a temperature of 120° C. and a pressing time of 30 seconds. The laminated product was irradiated with an ultraviolet ray (wavelength: 365 nm) to 4,000 mJ/cm$^2$ and then subjected to a heat treatment at 160° C. for 1 hour, thereby forming an upper cladding layer. Subsequently, the supporting film (Cosmoshine A4100) of the resin film for forming a cladding layer CLF-1 was removed, thereby providing a flexible optical waveguide. The flexible optical waveguide was then cut into a size with a width of 3 mm and a length of 100 mm with a dicing saw (DAD-341, produced by Disco Corporation).

Measurement of Optical Transmission Loss

The resulting optical waveguide was measured for optical transmission loss with a VCSEL (FLS-300-01-VCL, produced by EXFO, Inc.) having a wavelength of 850 nm as a central wavelength which was used for a light source, a photodiode (Q82214, produced by Advantest Corporation), an incident fiber (GI-50/125 multimode fiber, NA=0.20) and an output fiber (SI-114/125, NA=0.22) by a cutback method (measured waveguide length: 10, 5, 3 and 2 cm), and evaluated by the following standard.

AA: 0.1 dB/cm or less
A: more than 0.1 dB/cm and 0.2 dB/cm or less
B: more than 0.2 dB/cm and 0.3 dB/cm or less
C: more than 0.3 dB/cm High Temperature and High Humidity Shelf Test The resulting optical waveguide was subjected to a high temperature and high humidity shelf test at a temperature of 85° C. and a humidity of 85% for 1,000 hours according to the JPCA Standard (JPCA-PE02-05-01S) with a high temperature and high humidity tester (PL-2KT, produced by Espec Corporation).

The optical transmission loss of the optical waveguide after performing the high temperature and high humidity shelf test was measured with the same light source, light receiving device, incident fiber and output fiber as above, and evaluated by the following standard.

AA: 0.1 dB/cm or less
A: more than 0.1 dB/cm and 0.2 dB/cm or less
B: more than 0.2 dB/cm and 0.3 dB/cm or less
C: more than 0.3 dB/cm Temperature Cycle Test The resulting optical waveguide was subjected to a temperature cycle test between temperatures of −55° C. and 125° C. in 1,000 cycles according to the JPCA Standard (JPCA-PE02-05-01S) with a temperature cycle tester (ETAC WINTECH NT1010, produced by Kusumoto Chemicals, Ltd.). The detailed temperature cycle test conditions are shown in Table 1.

TABLE 1

| Item | | Temperature (° C.) | Time (min) |
|---|---|---|---|
| 1 Cycle | Step 1 | −55 | 15 |
| | Step 2 | 125 | 15 |

The optical transmission loss of the optical waveguide after performing the temperature cycle test was measured with the same light source, light receiving device, incident fiber and output fiber as above, and evaluated by the following standard.

Figure 2:
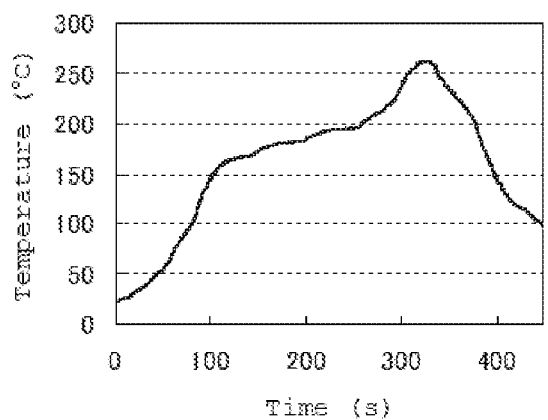
FIG. 2 The figure is a graph showing a temperature profile in a reflow furnace on a reflow test performed in examples.

AA: 0.1 dB/cm or less
A: more than 0.1 dB/cm and 0.2 dB/cm or less
B: more than 0.2 dB/cm and 0.3 dB/cm or less
C: more than 0.3 dB/cm Reflow Test The resulting optical waveguide was subjected to a reflow test with a maximum temperature of 265° C. in a nitrogen atmosphere three times under conditions according to IPC/JEDEC J-STD-020B with a reflow tester (Salamander XNA-645PC, produced by Furukawa Electric Co., Ltd.). The detailed reflow conditions are shown in Table 2, and the temperature profile in the reflow furnace is shown in FIG. 2.

TABLE 2

| Zone No. | 1 | 2 | 3 | 4 | 5 | 6 | 7 |
|---|---|---|---|---|---|---|---|
| Upper heater temperature (° C.) | 175 | 195 | 220 | 250 | 280 | 220 | 0 |
| Lower heater temperature (° C.) | 175 | 195 | 220 | 250 | 300 | 240 | 0 |
| Conveyer speed (cm/min) | | | | 60 | | | |

The optical transmission loss of the optical waveguide after performing the reflow test was measured with the same light source, light receiving device, incident fiber and output fiber as above, and evaluated by the following standard.

AA: 0.1 dB/cm or less
A: more than 0.1 dB/cm and 0.2 dB/cm or less
B: more than 0.2 dB/cm and 0.3 dB/cm or less
C: more than 0.3 dB/cm Examples 2 to 5 and Comparative Example 1

Resin compositions for forming a core part COV-2 to COV-6 were prepared according to the formulations shown in Table 3, and resin films for forming a core part COF-2 to COF-6 were produced in the same manner as in Example 1.

Subsequently, flexible optical waveguides were produced in the same manner as in Example 1 by using the resin films for forming a core part COF-2 to COF-6.

TABLE 3

| Item | Mixed component (part by mass) | COV-1 (COF-1) | COV-2 (COF-2) | COV-3 (COF-3) | COV-4 (COF-4) | COV-5 (COF-5) | COV-6 (COF-6) |
|---|---|---|---|---|---|---|---|
| Component (A) | A-1 solution *[1] (solid content: 45% by mass) | 67 (solid content: 30) | 89 (solid content: 40) | 100 (solid content: 45) | — | 89 (solid content: 40) | — |
| | A-2 solution *[2] (solid content: 45% by mass) | — | — | — | 100 (solid content: 45) | — | — |
| Component (B) | FA-321A *[3] | 30 | 15 | 15 | 15 | — | — |
| | A-BPEF/PGMAC *[4] (solid content: 70% by mass) | 29 (solid content: 20) | 32 (solid content 23) | 29 (solid content: 20) | 29 (solid content: 20) | 33 (solid content: 23) | 29 (solid content: 20) |
| | EA-1020 *[5] | 20 | 23 | 20 | 20 | 23 | 20 |
| | EA-5222 *[6] | — | — | — | — | 15 | — |
| Component (C) | 2959 *[7] | 1 | 1 | 1 | 1 | 1 | 1 |
| | 819 *[8] | 1 | 1 | 1 | 1 | 1 | 1 |
| Dilution solvent | PGMEA *[9] | 22 | 20 | 19 | 19 | 18 | — |
| Other components | P-1 solution *[10] (solid content: 42% by mass) | — | — | — | — | — | 143 (solid content: 60) |
| | YP-70 solution *[11] (solid content: 40% by mass) | — | — | — | — | — | — |

TABLE 3-continued

| Item | Mixed component (part by mass) | COV-1 (COF-1) | COV-2 (COF-2) | COV-3 (COF-3) | COV-4 (COF-4) | COV-5 (COF-5) | COV-6 (COF-6) |
|---|---|---|---|---|---|---|---|
| Evaluation | Breaking elongation (%) | 4 | 5 | 4 | 3 | 4 | 2 |
| | Tensile elastic modulus (GPa) | 2.1 | 2.3 | 2.3 | 2.4 | 2.2 | 2.0 |

[1] cyclohexanone solution of polyhydroxy polyether A-1 having ethylenically unsaturated group on side chain and aromatic ring on main chain synthesized in Synthesis Example 1 (solid content: 45% by mass)
[2] cyclohexanone solution of polyhydroxy polyether A-2 having ethylenically unsaturated group on side chain and aromatic ring on main chain synthesized in Synthesis Example 2 (solid content: 45% by mass)
[3] ethoxylated bisphenol A diacrylate (Fancryl FA-321A, produced by Hitachi Chemical Co., Ltd.)
[4] propylene glycol monomethyl ether acetate solution of ethoxylated fluorene type bisphenol diacrylate (NK Ester A-BPEF/PGMAC, produced by Shin-Nakamura Chemical Co., Ltd., solid content: 70% by mass)
[5] bisphenol A type epoxy diacrylate (NK Oligo EA-1020, produced by Shin-Nakamura Chemical Co., Ltd.)
[6] aromatic epoxy (meth)acrylate represented by the general formula (6) (wherein $Z^5$ represents —$C(CH_3)_2$—) (NK Oligo EA-5222, produced by Shin-Nakamura Chemical Co., Ltd.)
[7] 1-[4-(2-hydroxyethoxy)phenyl]-2-hydroxy-2-methyl-1-propan-1-one (Irgacure 2959, produced by Ciba Japan Co., Ltd.)
[8] bis(2,4,6-trimethylbenzoyl)phenylphosphine oxide (Irgacure 819, produced by Ciba Japan Co., Ltd.)
[9] propylene glycol monomethyl ether acetate
[10] methyl ethyl ketone solution of (meth)acrylic polymer P-1 produced in Synthesis Example 4 (solid content: 42% by mass)
[11] propylene glycol monomethyl ether acetate solution of polyhydroxy polyether having aromatic ring on main chain (Phenotohto YP-70, produced by Tohto Kasei Co., Ltd.) (solid content: 40% by mass)

The resulting optical waveguides (length: 100 mm) were subjected to the measurement of optical transmission loss, the high temperature and high humidity shelf test, the temperature cycle test and the reflow test under the same conditions as above.

The results obtained are shown in Table 4.

TABLE 4

| Item | Example 1 | Example 2 | Example 3 | Example 4 | Example 5 | Comparative Example 1 |
|---|---|---|---|---|---|---|
| Resin film for forming core part | COF-1 | COF-2 | COF-3 | COF-4 | COF-5 | COF-6 |
| Resin film for forming cladding layer | CLF-1 | CLF-1 | CLF-1 | CLF-1 | CLF-1 | CLF-1 |
| Optical transmission loss [12] | A | A | AA | AA | AA | A |
| High temperature and high humidity shelf test [12] | A | A | A | A | AA | A |
| Temperature cycle test [12] | A | A | A | A. | AA | C |
| Reflow test [12] | A | A | A | A | AA | C |

[12] AA: 0.1 dB/cm or less, A: more than 0.1 dB/cm and 0.2 dB/cm or less, C: more than 0.3 dB/cm It is understood from Tables 3 and 4 that the resin composition for forming an optical waveguide of the present invention is excellent in transparency and heat resistance and is excellent in toughness from the standpoint of breaking elongation and tensile elastic modulus, and the optical waveguides produced therewith have low optical transmission loss, are excellent in transparency, are excellent in environmental reliability since they are good in high temperature and high humidity shelf test, temperature cycle test and the like, and are excellent in heat resistance since they are good in results of reflow test and the like. On the other hand, it is also understood that the resin composition for forming an optical waveguide shown in Comparative Example 1, which does not belong to the present invention, has a certain degree of toughness, but the optical waveguide produced with the resin composition for forming an optical waveguide is inferior in environmental reliability and heat resistance.

INDUSTRIAL APPLICABILITY

The resin composition for forming an optical waveguide of the present invention is excellent in transparency, heat resistance and toughness, and the optical waveguide produced therewith is excellent in transparency, environmental reliability and heat resistance. The resin film for forming an optical waveguide using the resin composition for forming an optical waveguide enhances the flatness of the layers, the interlayer adhesiveness between the clad and the core, and the resolution upon forming the core pattern of the optical waveguide (i.e., the performance on thin lines or narrow line gaps), in the production process of an optical waveguide, thereby forming a fine pattern excellent in flatness having small line width and line gaps.

DESCRIPTION OF SYMBOLS 1 optical waveguide
2 core part
3 upper cladding layer
4 lower cladding layer
5 substrate

The invention claimed is:

1. A resin composition for forming an optical waveguide, comprising (A) a polyhydroxy polyether having an ethylenically unsaturated group on a side chain and an aromatic ring on a main chain, (B) a polymerizable compound having an ethylenically unsaturated group, and (C) a radical polymerization initiator,
wherein the component (A) has structural units represented by the following general formulae (3) and (2), wherein the polyhydroxy polyether has structural units represented by the general formula (3) in a content of 3 to 70% by mol, and has structural units represented by the general formula (2) in a content of 30 to 97% by mol:

$$-O-X^1-O-CH_2CHCH_2- \quad (3)$$

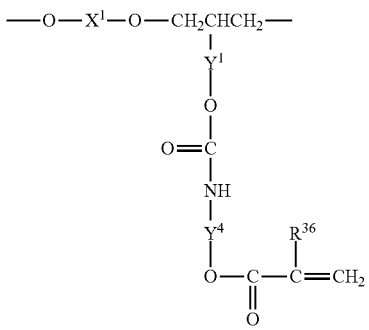

wherein $R^{36}$ represents a hydrogen atom or a methyl group; $X^1$ represents a divalent group selected from

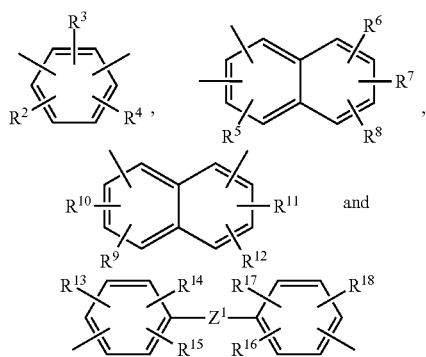

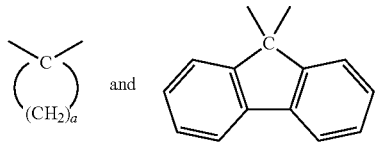

wherein $R^2$ to $R^{18}$ each independently represent a hydrogen atom, a fluorine atom or an organic group having from 1 to 20 carbon atoms; $Z^1$ represents a single bond or a divalent group selected from an oxygen atom, a sulfur atom, $-CH_2-$, $-C(CH_3)_2-$, $-CF_2-$, $-C(CF_3)_2-$, $-SO_2-$,

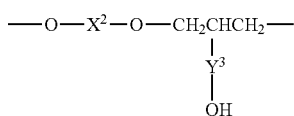

wherein a represents an integer of from 2 to 10; $Y^1$ represents a single bond or a divalent organic group having from 1 to 20 carbon atoms; and $Y^4$ represents a divalent organic group having from 1 to 18 carbon atoms, and $$-O-X^2-O-CH_2CHCH_2- \quad (2)$$
$$\overset{|}{Y^3}$$
$$\overset{|}{OH}$$

wherein $X^2$ represents a divalent group selected from

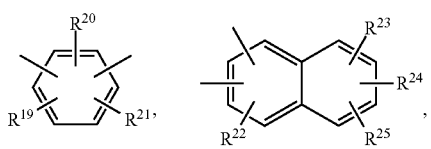

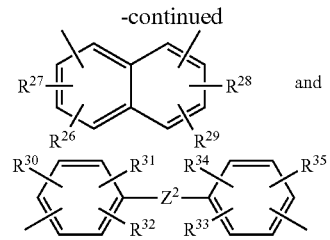 and

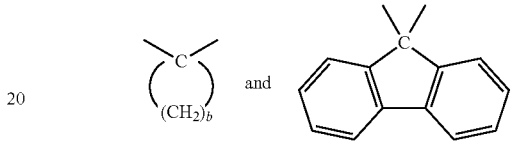

wherein $R^{19}$ to $R^{35}$ each independently represent a hydrogen atom, a fluorine atom or an organic group having from 1 to 20 carbon atoms; $Z^2$ represents a single bond, an oxygen atom, a sulfur atom or a divalent group selected from $-CH_2-$, $-C(CH_3)_2-$, $-CF_2-$, $-C(CF_3)_2-$, $-SO_2-$,

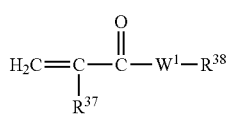

wherein b represents an integer of from 2 to 10; and $Y^3$ represents a single bond or a divalent organic group having from 1 to 20 carbon atoms.

2. The resin composition for forming an optical waveguide according to claim 1, wherein an amount of the component (A) mixed is from 10 to 90% by mass based on a total amount of the component (A) and the component (B); an amount of the component (B) mixed is from 10 to 90% by mass based on a total amount of the component (A) and the component (B); and an amount of the component (C) mixed is from 0.1 to 10 parts by mass per 100 parts by mass of a total amount of the component (A) and the component (B).

3. The resin composition for forming an optical waveguide according to claim 1, wherein the polymerizable compound having an ethylenically unsaturated group (B) is a compound containing at least one selected from the group consisting of an alicyclic structure, a heterocyclic structure, an aryl group, an aryloxy group and an aralkyl group in a molecule thereof.

4. The resin composition for forming an optical waveguide according to claim 1, wherein the polymerizable compound having an ethylenically unsaturated group (B) is a (meth) acrylate.

5. The resin composition for forming an optical waveguide according to claim 4, wherein the polymerizable compound having an ethylenically unsaturated group (B) is at least one of (meth)acrylates represented by the following general formulae (4) to (6):

$$H_2C=\underset{R^{37}}{\overset{|}{C}}-\overset{O}{\overset{\|}{C}}-W^1-R^{38} \quad (4)$$

wherein $R^{37}$ represents a hydrogen atom or a methyl group; $R^{38}$ represents any one monovalent group selected from

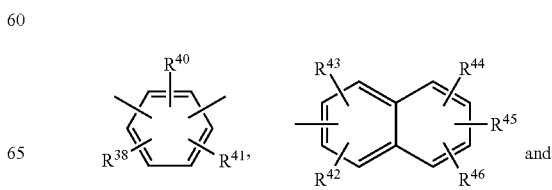

-continued

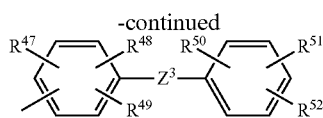

wherein $R^{39}$ to $R^{52}$ each independently represent any one selected from a hydrogen atom, a fluorine atom and an organic group having from 1 to 20 carbon atoms; $Z^3$ represents a single bond, an oxygen atom, a sulfur atom or a divalent group selected from $-CH_2-$, $-C(CH_3)_2-$, $-CF_2-$, $-C(CF_3)_2-$, $-SO_2-$,

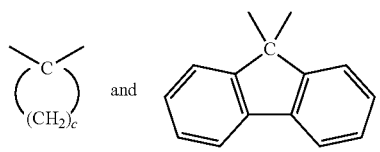

wherein c represents an integer of from 2 to 10; $W^1$ contains an oxygen atom, a sulfur atom or a divalent group selected from $-OCH_2-$, $-SCH_2-$, $-O(CH_2CH_2O)_d-$, $-O[CH_2CH(CH_3)O]_e-$, $-O[(CH_2)_5CO_2]_f-$ and $-OCH_2CH(OH)CH_2O-$, wherein d to f represent an integer of from 1 to 10,

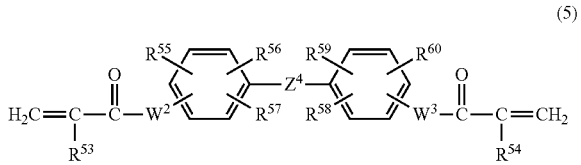

wherein $R^{53}$ and $R^{54}$ each independently represent a hydrogen atom or a methyl group; $R^{55}$ to $R^{60}$ each independently represent any one selected from a hydrogen atom, a fluorine atom and an organic group having from 1 to 20 carbon atoms; $Z^4$ represents a single bond, an oxygen atom, a sulfur atom or a divalent group selected from $-CH_2-$, $-C(CH_3)_2-$, $-CF_2-$, $-C(CF_3)_2-$, $-SO_2-$,

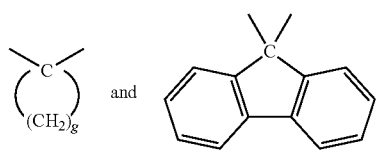

wherein g represents an integer of from 2 to 10; and $W^2$ and $W^3$ each independently contain an oxygen atom, a sulfur atom or a divalent group selected from $-OCH_2-$, $-SCH_2-$, $-O(CH_2CH_2O)_h-$, $-O[CH_2CH(CH_3)O]_i-$ and $-O[(CH_2)_5CO_2]_j-$, wherein h to j each independently represent an integer of from 1 to 10,

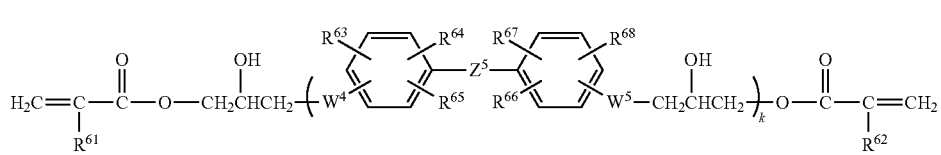

(6)

wherein k represents an integer of from 1 to 10; $R^{61}$ and $R^{62}$ each independently represent a hydrogen atom or a methyl group; $R^{63}$ to $R^{68}$ each independently represent any one selected from a hydrogen atom, a fluorine atom and an organic group having from 1 to 20 carbon atoms; $Z^5$ represents a single bond, an oxygen atom, a sulfur atom or a divalent group selected from $-CH_2-$, $-C(CH_3)_2-$, $-CF_2-$, $-C(CF_3)_2-$, $-SO_2-$,

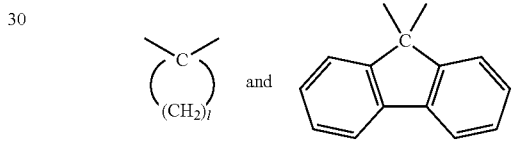

wherein l represents an integer of from 2 to 10; and $W^4$ and $W^5$ each independently contain an oxygen atom or a divalent group selected from $-O(CH_2CH_2O)_m-$, $-O[CH_2CH(CH_3)O]_n-$ and $-O[(CH_2)_5CO_2]_o-$, wherein m to o each independently represent an integer of from 1 to 10.

6. The resin composition for forming an optical waveguide according to claim 1, wherein the radical polymerization initiator (C) is a photo radical polymerization initiator.

7. A resin film for forming an optical waveguide formed by using the resin composition for forming an optical waveguide according to claim 1.

8. An optical waveguide comprising a core part formed by using the resin composition for forming an optical waveguide according to claim 1.

9. An optical waveguide comprising a core part formed by using the resin film for forming an optical waveguide according to claim 7.

10. The optical waveguide according to claim 8, wherein the optical waveguide has an optical transmission loss of 0.3 dB/cm or less.

11. The optical waveguide according to claim 8, wherein the optical waveguide has an optical transmission loss of 0.3 dB/cm or less with a light source having a wavelength of 850 nm after performing a high temperature and high humidity shelf test at a temperature of 85° C. and a humidity of 85% for 1,000 hours.

12. The optical waveguide according to claim 8, wherein the optical waveguide has an optical transmission loss of 0.3 dB/cm or less with a light source having a wavelength of 850 nm after performing a temperature cycle test between temperatures of −55° C. and 125° C. in 1,000 cycles.

13. The optical waveguide according to claim 8, wherein the optical waveguide has an optical transmission loss of 0.3 dB/cm or less with a light source having a wavelength of 850 nm after performing a reflow test with a maximum temperature of 265° C. three times.

14. The resin composition for forming an optical waveguide according to claim 1, wherein content of the polyhydroxy polyether in the resin composition is 10 to 90% by mass based on the total amount of the polyhydroxy polyether and the polymerizable compound having an ethylenically unsaturated group.

15. The resin composition for forming an optical waveguide according to claim 14, wherein content of the polymerizable compound having an ethylenically unsaturated group in the resin composition is 10 to 90% by mass based on the total amount of the polyhydroxy polyether and the polymerizable compound having an ethylenically unsaturated group.

* * * * *